(12) United States Patent
Kim et al.

(10) Patent No.: US 12,400,671 B2
(45) Date of Patent: Aug. 26, 2025

(54) WEARABLE ELECTRONIC DEVICE RECEIVING INFORMATION FROM EXTERNAL WEARABLE ELECTRONIC DEVICE AND METHOD FOR OPERATING THE SAME

(71) Applicant: SAMSUNG ELECTRONICS CO., LTD., Suwon-si (KR)

(72) Inventors: Hanjib Kim, Suwon-si (KR); Doosuk Kang, Suwon-si (KR); Seungnyun Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 648 days.

(21) Appl. No.: 17/581,454

(22) Filed: Jan. 21, 2022

(65) Prior Publication Data
US 2022/0230649 A1    Jul. 21, 2022

Related U.S. Application Data

(63) Continuation of application No. PCT/KR2022/000998, filed on Jan. 19, 2022.

(30) Foreign Application Priority Data

Jan. 21, 2021   (KR) .......................... 10-2021-0008797

(51) Int. Cl.
*G10L 21/0208*   (2013.01)
*G02B 27/01*     (2006.01)
(Continued)

(52) U.S. Cl.
CPC ........ *G10L 21/0208* (2013.01); *G02B 27/017* (2013.01); *G06F 3/013* (2013.01);
(Continued)

(58) Field of Classification Search
CPC ... G10L 21/0208; G10L 15/005; G10L 15/22; G10L 2021/02087; G06F 3/013; G06F 3/017; G02B 27/017
See application file for complete search history.

(56) References Cited

U.S. PATENT DOCUMENTS

2009/0238377 A1\* 9/2009 Ramakrishnan ....... H04R 3/005
                                                381/92
2011/0092157 A1\* 4/2011 Clark ................. H04M 1/6066
                                                455/66.1
(Continued)

FOREIGN PATENT DOCUMENTS

CN    109696748 A    4/2019
JP    2019-203987 A  11/2019
(Continued)

OTHER PUBLICATIONS

Communication dated Mar. 14, 2024 issued by the European Patent Office in European Application No. 22742830.7.
(Continued)

*Primary Examiner* — Sonia L Gay
(74) *Attorney, Agent, or Firm* — Sughrue Mion, PLLC

(57) ABSTRACT

According to various embodiments, a wearable electronic device may comprise a display, a communication circuit, a voice input device, and at least one processor operatively connected with the display, the communication circuit, and the voice input device. The at least one processor may be configured to obtain audio data through the voice input device, identify whether the audio data satisfies a predetermined condition, receive, from an external wearable electronic device through the communication circuit, state information based on a signal obtained from the external wearable electronic device, and control the display to display visual information corresponding to the audio data,
(Continued)

based on at least part of the state information. Other various embodiments are possible as well.

18 Claims, 14 Drawing Sheets

(51) Int. Cl.
*G06F 3/01* (2006.01)
*G10L 15/00* (2013.01)
*G10L 15/22* (2006.01)

(52) U.S. Cl.
CPC ............ *G06F 3/017* (2013.01); *G10L 15/005* (2013.01); *G10L 15/22* (2013.01); *G10L 2021/02087* (2013.01)

(56) References Cited

U.S. PATENT DOCUMENTS

| | | | |
|---|---|---|---|
| 2011/0151788 A1* | 6/2011 | Castrogiovanni | H04W 76/23 455/41.2 |
| 2012/0245920 A1* | 9/2012 | Wu | G06F 40/58 704/E11.001 |
| 2013/0124204 A1 | 5/2013 | Wong et al. | |
| 2014/0337023 A1* | 11/2014 | McCulloch | G06F 3/011 704/235 |
| 2015/0070251 A1 | 3/2015 | Kim et al. | |
| 2015/0130711 A1 | 5/2015 | Lee et al. | |
| 2015/0296294 A1* | 10/2015 | Paquier | G10K 11/17881 381/71.1 |
| 2015/0379992 A1* | 12/2015 | Lee | G10L 15/22 704/275 |
| 2016/0165372 A1* | 6/2016 | Weksler | H04M 1/724 381/56 |
| 2017/0143962 A1* | 5/2017 | Mishra | A61N 1/37211 |
| 2017/0186441 A1* | 6/2017 | Wenus | H04N 7/147 |
| 2017/0243582 A1 | 8/2017 | Menezes et al. | |
| 2018/0068662 A1* | 3/2018 | Schlippe | G10L 25/90 |
| 2018/0090154 A1* | 3/2018 | Aaron | H04L 12/1827 |
| 2018/0091643 A1* | 3/2018 | Singh | G06F 3/04842 |
| 2018/0307303 A1 | 10/2018 | Powderly et al. | |
| 2019/0066684 A1* | 2/2019 | Dozen | G06F 3/167 |
| 2019/0250412 A1 | 8/2019 | Jiang | |
| 2019/0293746 A1* | 9/2019 | Lee | G01S 5/18 |
| 2020/0050861 A1 | 2/2020 | Wexler et al. | |
| 2020/0134026 A1 | 4/2020 | Lovitt et al. | |
| 2020/0174734 A1 | 6/2020 | Gomes et al. | |
| 2020/0344560 A1* | 10/2020 | Oplinger | H04R 25/70 |
| 2021/0103426 A1 | 4/2021 | Heo | |
| 2021/0319782 A1 | 10/2021 | Gong et al. | |
| 2021/0405395 A1* | 12/2021 | Li | H04R 1/1041 |

FOREIGN PATENT DOCUMENTS

| | | |
|---|---|---|
| KR | 10-2015-0029976 A | 3/2015 |
| KR | 10-2016-0001964 A | 1/2016 |
| KR | 10-1668165 B1 | 10/2016 |
| KR | 10-1860309 B1 | 6/2018 |
| KR | 10-2018-0116044 A | 10/2018 |
| KR | 10-2019-0121720 A | 10/2019 |
| KR | 10-2019-0141696 A | 12/2019 |
| KR | 10-2020-0026798 A | 3/2020 |
| WO | 2011/112165 A1 | 9/2011 |
| WO | 2020/037795 A1 | 2/2020 |

OTHER PUBLICATIONS

International Search Report (PCT/ISA/210) dated Apr. 26, 2022 issued by the International Searching Authority in International Application No. PCT/KR2022/000998.
Written Opinion (PCT/ISA/237) dated Apr. 26, 2022 issued by the International Searching Authority in International Application No. PCT/KR/2022/000998.
Communication issued Jan. 30, 2025 by the European Patent Office in European Patent Application No. 22 742 830.7.
Communication dated Jun. 16, 2025, issued by the Korean Intellectual Office in Korean Application No. 10-2021-0008797.

* cited by examiner

WEARABLE ELECTRONIC DEVICE RECEIVING INFORMATION FROM EXTERNAL WEARABLE ELECTRONIC DEVICE AND METHOD FOR OPERATING THE SAME

CROSS-REFERENCE TO RELATED APPLICATIONS

This application is a continuation of International Application No. PCT/KR2022/000998 designating the United States, filed on Jan. 19, 2022, in the Korean Intellectual Property Receiving Office and claiming priority to Korean Patent Application No. 10-2021-0008797, filed on Jan. 21, 2021 in the Korean Intellectual Property Office, the disclosures of which are incorporated by reference herein in their entireties.

BACKGROUND

1. Field

The disclosure relates to a wearable electronic device receiving information from an external wearable electronic device and a method for operating the same.

2. Description of Related Art

Augmented reality (AR) is technology for overlaying three-dimensional (3D) (or two-dimensional (2D)) virtual images on a real-world image or background and displaying them as overlaid images. AR technology which combines the real-world environment with virtual objects enables the user to view the real-world environment, thereby providing a better real-life feel and additional information. The user may observe the image together with the real-world environment and identify information about a target object in the environment that he is currently viewing.

An augmented reality device may be a wearable electronic device. For example, AR glasses-type electronic devices, which may be worn on the face like glasses, are in wide use.

Speech to text (STT) is a technology for receiving a voice, converting the input voice into a text form, and outputting it. When a wearable electronic device is worn, voices generated in the ambient environment may be less perceivable. Thus, it is possible to visually provide information about a voice generated in the ambient environment to the user of the wearable electronic device through the STT function.

To provide an STT function according to a user's need, a wearable electronic device supporting the STT function may determine in what situation it is to support the STT function. For example, the wearable electronic device may operate while being worn on the user's body portion. Thus, it may be limited to obtain sufficient data to determine whether the user is under the situation where the STT function is needed, only with the wearable electronic device providing the STT function.

Further, in general, a wearable electronic device may have a small size to be worn on the user's body portion and may thus obtain only data in a local environment. Thus, the accuracy of the STT function may be limited.

SUMMARY

According to an embodiment, a wearable electronic device may receive, from an external wearable electronic device, state information based on a signal obtained from the external wearable electronic device and provide an STT function considering the state information.

According to an embodiment, a wearable electronic device may comprise a display, a communication circuit, a voice input device, and at least one processor. The at least one processor may be configured to obtain audio data through the voice input device, identify whether the audio data satisfies a predetermined condition, receive, from an external wearable electronic device through the communication circuit, state information based on a signal obtained from the external wearable electronic device, and control the display to display visual information corresponding to the audio data, based on at least part of the state information.

According to an embodiment, a wearable electronic device may comprise a display, a communication circuit, a voice input device, and at least one processor. The at least one processor may be configured to obtain first audio data corresponding to an external event through the voice input device, receive, from an external wearable electronic device through the communication circuit, second audio data corresponding to the external event and obtained from the external wearable electronic device, identify a direction corresponding to the external event, based on the first audio data and the second audio data, and perform an operation corresponding to the identified direction.

According to an embodiment, a method performed in a wearable electronic device may comprise obtaining audio data, identifying whether the audio data satisfies a predetermined condition, receiving, from an external wearable electronic device, state information based on a signal obtained from the external wearable electronic device, and displaying visual information corresponding to the audio data, based on at least part of the state information.

According to an embodiment, there may be provided a wearable electronic device receiving information from an external wearable electronic device and a method for operating the same. According to an embodiment, a wearable electronic device may receive, from an external wearable electronic device, state information based on a signal obtained from the external wearable electronic device and provide an STT function considering the state information. According to an embodiment, a wearable electronic device may determine whether to provide an STT function considering state information based on a signal obtained from an external wearable electronic device and may thus accurately determine whether the user is under a situation where the STT function is needed. Further, according to an embodiment, a wearable electronic device provides an STT function based on state information which is based on a signal obtained from an external wearable electronic device. Thus, the wearable electronic device may provide an STT function with high accuracy.

DETAILED DESCRIPTION

Figure 1:
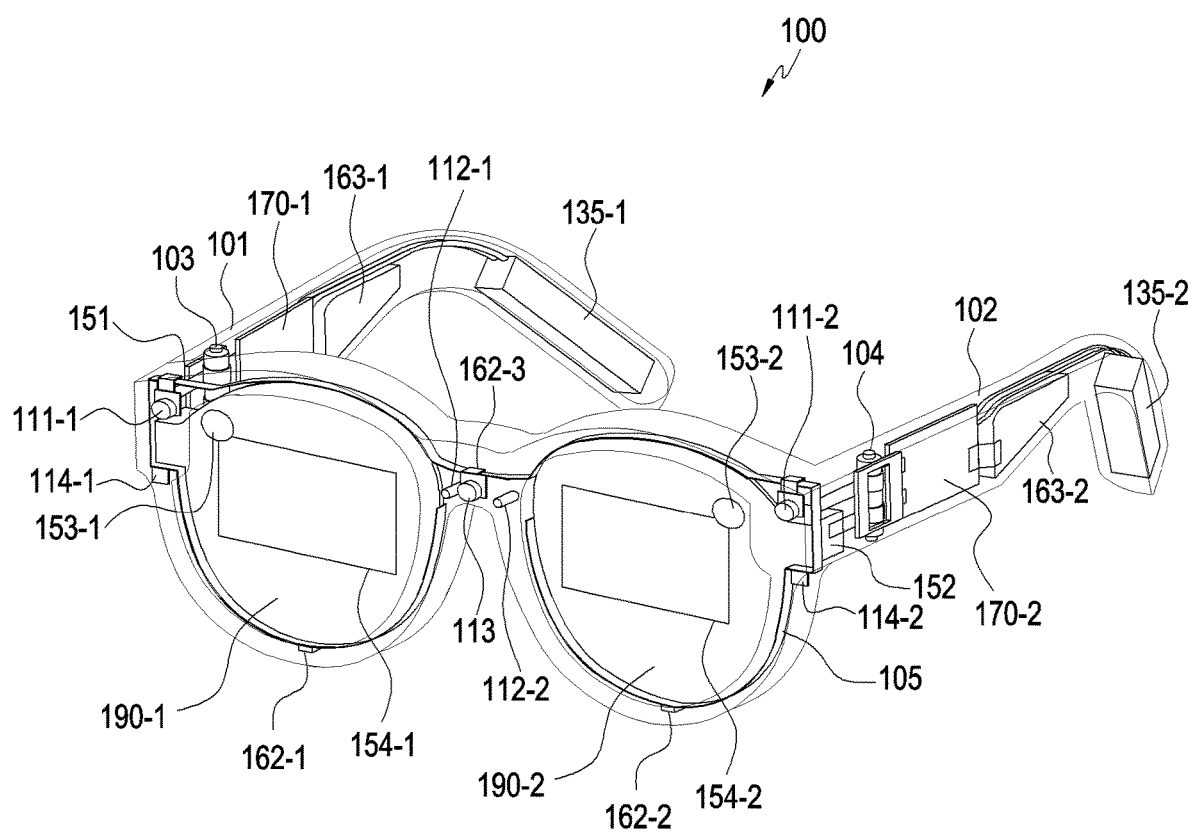
FIG. 1 illustrates a structure of a wearable electronic device according to various embodiments.

As is traditional in the field, embodiments may be described and illustrated in terms of blocks which carry out a described function or functions. These blocks, as shown in the drawings, which may be referred to herein as units or modules or the like, or by names such as device or the like, may be physically implemented by analog or digital circuits such as logic gates, integrated circuits, microprocessors, microcontrollers, memory circuits, passive electronic components, active electronic components, optical components, hardwired circuits, or the like, and may be driven by firmware and software. The circuits may, for example, be embodied in one or more semiconductor chips, or on substrate supports such as printed circuit boards and the like. Circuits included in a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks. Likewise, the blocks of the embodiments may be physically combined into more complex blocks.

FIG. 1 illustrates a structure of a wearable electronic device according to various embodiments. According to various embodiments, a wearable electronic device 100 may include a frame 105, a first support portion 101, a second support portion 102, a first hinge portion 103 connecting the frame 105 and the first support portion 101, and a second hinge portion 104 for connecting the frame 105 and the second support portion 102. According to an embodiment, the frame 105 may include at least one camera, for example a first camera 111-1, a first camera 111-2, a second camera 112-1, a second camera 112-2 and/or a third camera 113, one or more light emitting elements, for example a light emitting element 114-1 and a light emitting element 114-2, at least one display, for example a first display 151 and a second display 152, one or more audio input devices, for example an audio input device 162-1, an audio input device 162-2, and an audio input device 162-3, and one or more transparent members, for example a transparent member 190-1 and a transparent member 190-2. According to various embodiments, the wearable electronic device 100 may include one or more first cameras 111-1 and 111-2, one or more second cameras 112-1 and 112-2, and one or more third cameras 113. According to various embodiments, images obtained through one or more first cameras 111-1 and 111-2 may be used for detection of a hand gesture by the user, tracking the user's head, and spatial recognition. According to various embodiments, the one or more first cameras 111-1 and 111-1 may be global shutter (GS) cameras. According to various embodiments, the one or more first cameras 111-1 and 111-2 may perform a simultaneous localization and mapping (SLAM) operation through depth capture. According to various embodiments, the one or more first cameras 111-1 and 111-2 may perform spatial recognition for 6 degrees of freedom (DoF).

According to various embodiments, an image obtained through the one or more second cameras 112-1 and 112-2 may be used to detect and track the user's pupil. According to various embodiments, the one or more second cameras 112-1 and 112-2 may be GS cameras. According to various embodiments, the one or more second cameras 112-1 and 112-2 may correspond to the left eye and the right eye, respectively, and the one or more second cameras 112-1 and 112-2 may have the same performance.

According to various embodiments, the one or more third cameras 113 may be high-resolution cameras. According to various embodiments, the one or more third cameras 113 may perform an auto-focusing (AF) function and an image stabilization function. According to various embodiments, the one or more third cameras 113 may be a GS camera or a rolling shutter (RS) camera.

According to various embodiments, the wearable electronic device 100 may include one or more light emitting elements 114-1 and 114-2. The light emitting elements 114-1 and 114-2 may be different from a light source, which is described below, for irradiating light to a screen output area of the display. According to various embodiments, the light emitting elements 114-1 and 114-2 may irradiate light to facilitate pupil detection in detecting and tracking the user's pupils through the one or more second cameras 112-1 and 112-2. According to various embodiments, each of the light emitting elements 114-1 and 114-2 may include an LED. According to various embodiments, the light emitting elements 114-1 and 114-2 may irradiate light in an infrared band. According to various embodiments, the light emitting elements 114-1 and 114-2 may be attached around the frame 105 of the wearable electronic device 100. According to various embodiments, the light emitting elements 114-1 and 114-2 may be positioned around the one or more first cameras 111-1 and 111-2 and may assist in gesture detection, head tracking, and/or spatial recognition by the one or more first cameras 111-1 and 111-2 when the wearable electronic device 100 is used in a dark environment. According to various embodiments, the light emitting elements 114-1 and 114-2 may be positioned around the one or more third cameras 113 and may assist in obtaining images by the one or more third cameras 113 when the wearable electronic device 100 is used in a dark environment.

According to various embodiments, the wearable electronic device 100 may include a first display 151, a second display 152, one or more input optical members 153-1 and 153-2, one or more transparent members 190-1 and 190-2, and one or more screen display portions 154-1 and 154-2, which are positioned in the frame 105. According to various embodiments, the first display 151 and the second display 152 may include, e.g., a liquid crystal display (LCD), a digital mirror device (DMD), a liquid crystal on silicon (LCoS), or an organic light emitting diode (OLED), or a micro light emitting diode (micro LED). According to various embodiments, when the first display 151 and the second display 152 are formed of one of a liquid crystal display device, a digital mirror display device, or a silicon liquid crystal display device, the wearable electronic device may include a light source for irradiating light to a screen output area of the display. According to various embodiments, when the first display 151 and the second display 152 may generate light on their own, e.g., when formed of either organic light emitting diodes or micro LEDs, the wearable electronic device 100 may provide a virtual image of good quality to the user even when a separate light source is not included.

According to various embodiments, the one or more transparent members 190-1 and 190-2 may be disposed to face the user's eyes when the user wears the wearable electronic device 100. According to various embodiments, the one or more transparent members 190-1 and 190-2 may include at least one of a glass plate, a plastic plate, and a polymer. According to various embodiments, the user may view the outside world through the one or more transparent members 190-1 and 190-2 when the user wears the wearable electronic device 100. According to various embodiments, the one or more input optical members 153-1 and 153-2 may guide the light generated by the first display 151 and the second display 152 to the user's eyes. According to various embodiments, images based on the light generated by the first display 151 and the second display 152 may be formed on one or more screen display portions 154-1 and 154-2 on the one or more transparent members 190-1 and 190-2, and the user may view the images formed on the one or more screen display portions 154-1 and 154-2.

According to various embodiments, the wearable electronic device 100 may include one or more optical waveguides. The optical waveguide may transfer the light generated by the first display 151 and the second display 152 to the user's eyes. The wearable electronic device 100 may include one optical waveguide corresponding to each of the left eye and the right eye. According to various embodiments, the optical waveguide may include at least one of glass, plastic, or polymer. According to various embodiments, the optical waveguide may include a nano-pattern formed inside or on one outer surface, e.g., a polygonal or curved grating structure. According to various embodiments, the optical waveguide may include a free-form type prism, and in this case, the optical waveguide may provide incident light to the user through a reflective mirror. According to various embodiments, the optical waveguide may include at least one of at least one diffractive element, for example a diffractive optical element (DOE) or a holographic optical element (HOE), or a reflective element, for example a reflective mirror, and guide the display light emitted from the light source to the user's eyes using at least one diffractive element or reflective element included in the optical waveguide. According to various embodiments, the diffractive element may include input/output optical elements. According to various embodiments, the reflective element may include a member causing total reflection.

Figure 3:
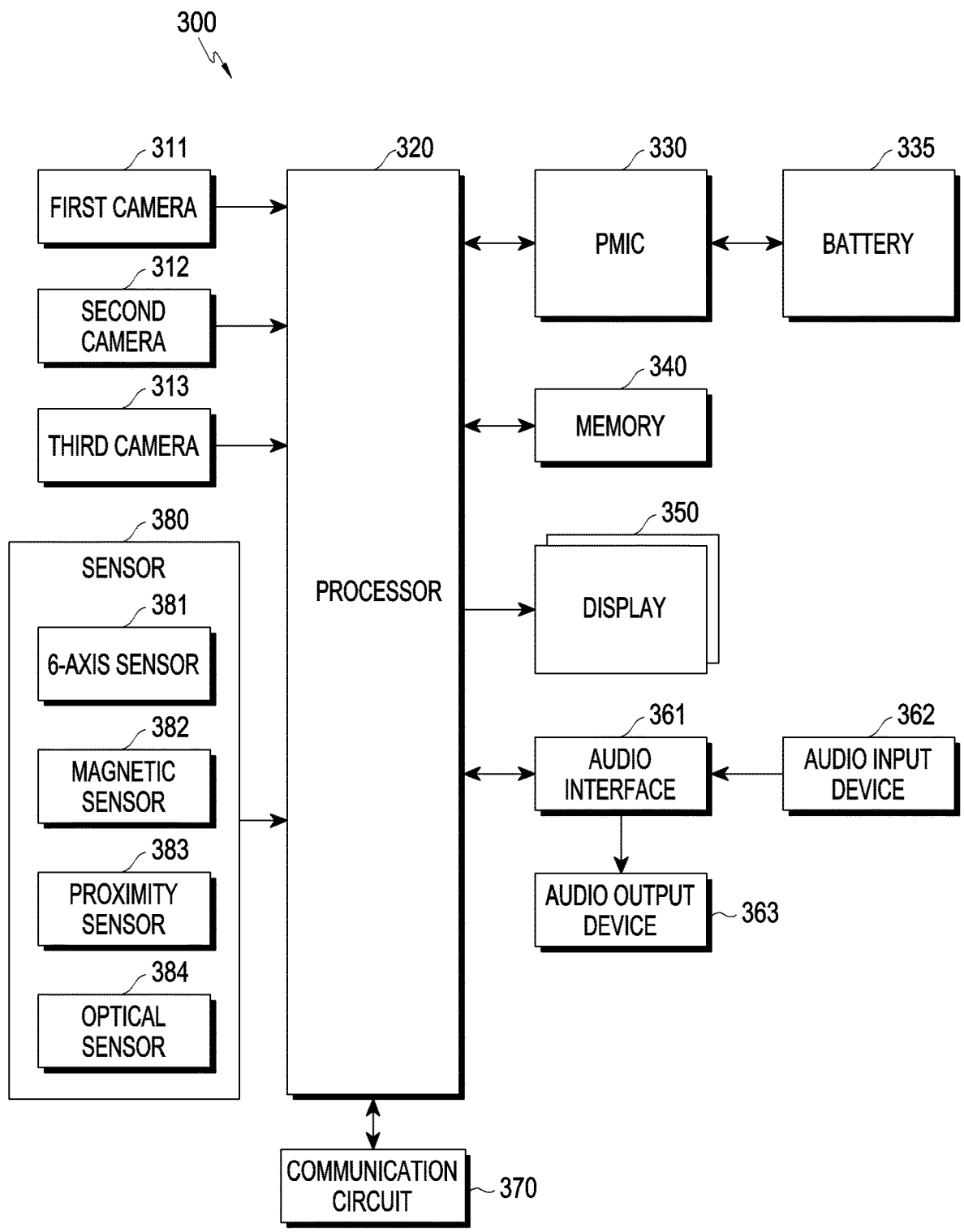
FIG. 3 is a block diagram illustrating a wearable electronic device according to various embodiments.

According to various embodiments, the wearable electronic device 100 may include the one or more audio input devices 162-1, 162-2, and 162-3, and the one or more audio input devices 162-1, 162-2, and 162-3 may receive the user's voice or sounds generated around the wearable electronic device 100. For example, the one or more audio input devices 162-1, 162-2, and 162-3 may receive the sound generated around and transfer the sound to the processor (e.g., the processor 320 of FIG. 3) so that the wearable electronic device 100 may provide a speech-to-text (STT) function.

According to various embodiments, the one or more support portions (e.g., the first support portion 101 and the second support portion 102) may include at least one printed circuit board (PCB), for example a first PCB 170-1 and a second PCB 170-2, one or more audio output devices, for example an audio output device 163-1 and an audio output device 163-2, and one or more batteries, for example a battery 135-1 and a battery 135-2. The first PCB 170-1 and the second PCB 170-2 may transfer electrical signals to components included in the wearable electronic device 100, such as a first camera 211, a second camera 212, a third camera 213, a display module 250, an audio module 261, and a sensor 280 described below with reference to FIG. 2. According to various embodiments, at least one of the first PCB 170-1 and the second PCB 170-2 may be a flexible printed circuit board (FPCB). According to various embodiments, the first PCB 170-1 and the second PCB 170-2 each may include a first substrate, a second substrate, and an interposer disposed between the first substrate and the second substrate. According to various embodiments, the wearable electronic device 100 may include the batteries 135-1 and 135-2. The batteries 135-1 and 135-2 may store power for operating the remaining components of the wearable electronic device 100. According to various embodiments, the one or more audio output devices 163-1 and 163-2 may output audio data to the user. For example, feedback on the user's command (or input) may be provided, or information about a virtual object may be provided to the user through audio data.

According to various embodiments, the wearable electronic device 100 may include one or more hinge portions (e.g., the first hinge portion 103 and the second hinge portion 104). For example, the first hinge portion 103 may allow the first support portion 101 to be coupled to the frame 105 and rotate about the frame 105, and the second hinge portion 104 may allow the second support portion 102 to be coupled to the frame 105 and rotate about the frame 105.

Figure 2:
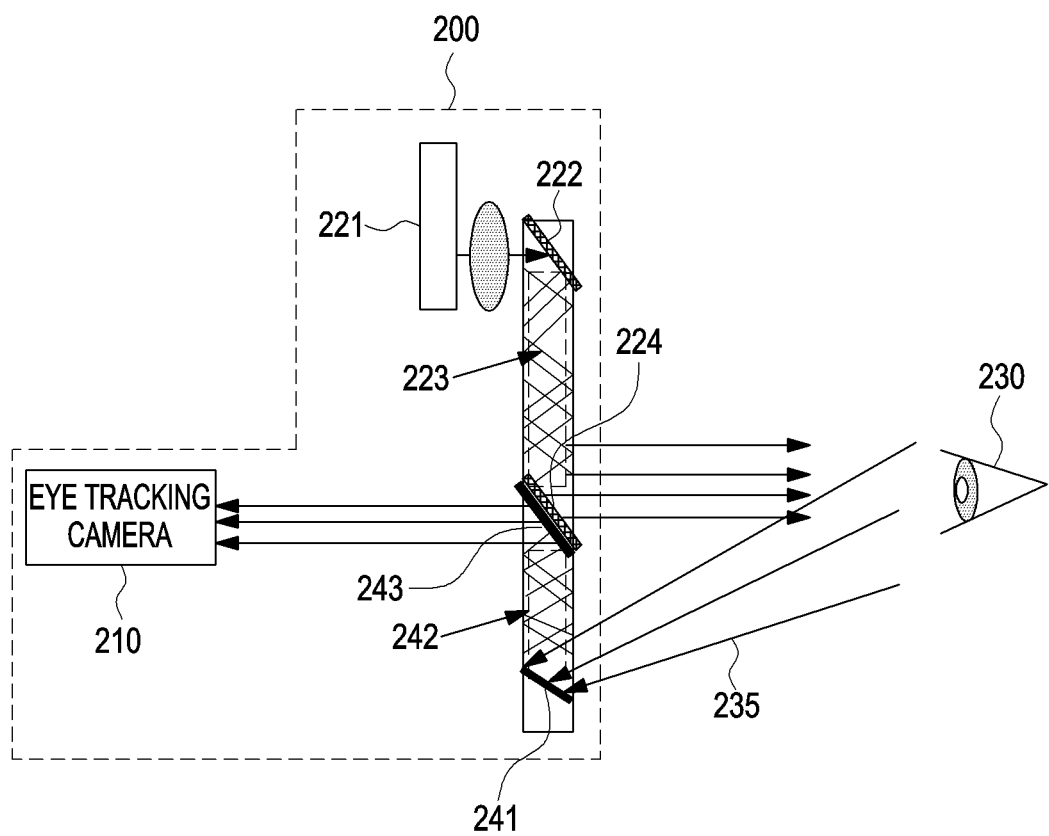
FIG. 2 illustrates a structure of a display and an eye tracking camera of a wearable electronic device according to various embodiments.

FIG. 2 illustrates a structure of a display and an eye tracking camera of a wearable electronic device according to various embodiments. A wearable electronic device 200 (e.g., the wearable electronic device 100 of FIG. 1) may include a display 221, an input optical member 222, a display optical waveguide 223, an output optical member 224, an eye tracking camera 210, a first splitter 241, an eye tracking optical waveguide 242, and a second splitter 243.

In the wearable electronic device, the display 221 may correspond to the first display 151 or the second display 152 illustrated in FIG. 1. The light output from the display 221 may pass through the input optical member 222, which may correspond to the input optical members 153-1 and 153-2 of FIG. 1, and be incident on the display optical waveguide 223, and then may pass through the display optical waveguide 223 and be output through the output optical member 224. The light output from the output optical member 224 may be seen by the user's eyes 230. Hereinafter, in embodiments, the expression "displays an object on the display"

may mean that light output from the display 221 may be output through the output optical member 224, and the shape of the object is seen by the user's eyes 230 by the light output through the output optical member 224. Further, in embodiments, the expression "controls the display to display the object" may mean that the light output from the display 221 may be output through the output optical member 224, and the display 221 is controlled so that the shape of the object is seen by the user's eyes 230 by the light output through the output optical member 224.

The light 235 reflected from the user's eye 230 may pass through the first splitter 241 and be incident on the eye tracking optical waveguide 242, and may then pass through the eye tracking optical waveguide 242 and be output to the eye tracking camera 210 through the second splitter 243. According to various embodiments, the light 235 reflected from the user's eye 230 may correspond to light output from the light emitting elements 114-1 and 114-2 of FIG. 1 and reflected from the user's eye 230. According to various embodiments, the eye tracking camera 210 may correspond to the one or more second cameras 112-1 and 112-1 illustrated in FIG. 2.

According to various embodiments, a wearable electronic device 300 may include a first camera 311, a second camera 312, a third camera 313, a processor 320, a power management integrated circuit (PMIC) 330, a battery 335, a memory 340, a display 350, an audio interface 361, an audio input device 362, an audio output device 363, a communication circuit 370, and a sensor 380.

According to various embodiments, the details of the one or more first cameras 111-1 and 111-2, one or more second cameras 112-1 and 112-2, and one or more third cameras 113 described above in connection with FIG. 1 may be equally applied to the first camera 311, the second camera 312, and the third camera 313, respectively. According to various embodiments, the wearable electronic device 300 may include at least one of the first camera 311, the second camera 312, and the third camera 313, in plurality.

According to various embodiments, the processor 320 may control other components of the wearable electronic device 300, e.g., the first camera 311, the second camera 312, the third camera 313, the PMIC 330, the memory 340, the display 350, the audio interface 361, the communication circuit 370, and the sensor 380 and may perform various data processing or computations.

According to various embodiments, the PMIC 330 may convert the power stored in the battery 335 to have the current or voltage required by the other components of the wearable electronic device 300 and supply power to other components of the wearable electronic device 300.

According to various embodiments, the memory 340 may store various data used by at least one component (e.g., the processor 320 or a sensor 380) of the wearable electronic device 300.

According to various embodiments, the display 350 may display a screen to be provided to the user. According to various embodiments, the display 350 may include the first display 151, the second display 152, one or more input optical members 153-1 and 153-2, one or more transparent members 190-1 and 190-2, and one or more screen display portions 154-1 and 154-2, which are described above in connection with FIG. 1.

According to various embodiments, the audio interface 361 may be connected to the audio input device 362 and the audio output device 363 and may convert the data input through the audio input device 362 and may convert data to be output to the audio output device 363. In embodiments, the audio input device 362 may include a microphone, and the audio output device 363 may include a speaker and an amplifier.

According to various embodiments, the communication circuit 370 may support establishment of a wireless communication channel with an electronic device outside the wearable electronic device 300 and performing communication through the established communication channel.

According to various embodiments, the sensor 380 may include a 6-axis sensor 381, a magnetic sensor 382, a proximity sensor 383, and an optical sensor 384. According to various embodiments, the sensor 380 may include a sensor for obtaining a biometric signal for detecting whether the wearable electronic device 300 is being worn by the user. For example, the sensor 380 may include at least one of a heart rate sensor, a skin sensor, and a temperature sensor.

According to various embodiments, when the user activates the STT function, the processor 320 may generate the text- and/or image-based data to be displayed through the display 350 based on the data received from the audio interface 361.

According to various embodiments, the processor 320 may identify the movement of the user wearing the wearable electronic device 300 through the 6-axis sensor 381. For example, the 6-axis sensor 381 may generate a sensor value by detecting a change in the direction the user faces (e.g., the direction the user views through the wearable electronic device 300) and may transfer the generated sensor value or a variation in the sensor value to the processor 320.

According to various embodiments, when the user activates the STT function, the audio interface 361 may receive a sound generated around the wearable electronic device 300 (or the user) through the audio input device 362 and may transfer the data obtained by converting the received sound to the processor 320.

According to various embodiments, the communication circuit 370 may transmit and receive data to and from an external electronic device (e.g., a wearable electronic device such as an earphone, or an external electronic device such as a terminal). For example, the wearable electronic device 300 may receive audio data received by the external wearable electronic device through the communication circuit 370 and may transfer the received audio data to the processor 320. As another example, the wearable electronic device 300 may output image data, which is based on data received from the external electronic device through the communication circuit 370, through the display 350.

Figure 4:
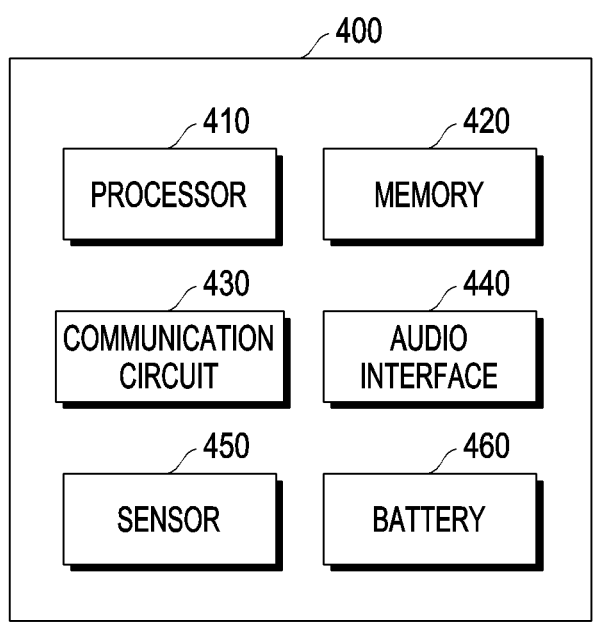
FIG. 4 is a block diagram illustrating an external wearable electronic device according to various embodiments.

FIG. 4 is a block diagram illustrating an external wearable electronic device 400 according to various embodiments. According to various embodiments, an external wearable electronic device 400 may be at least one of an earphone-type wearable electronic device, a watch-type wearable electronic device, or a necklace-type wearable electronic device. According to various embodiments, the external wearable electronic device 400 may have a plurality of physically separated housings. For example, when the external wearable electronic device 400 is an earphone-type wearable electronic device, the external wearable electronic device 400 may include a first housing to be worn on the left ear and a second housing to be worn on the right ear. In embodiments, the components illustrated in FIG. 4 may be included in one or more of the plurality of housings.

According to various embodiments, the external wearable electronic device 400 may include a processor 410, a memory 420, a communication circuit 430, an audio interface 440, a sensor 450, and a battery 460.

According to various embodiments, the processor 410 may receive data from other components of the external wearable electronic device 400, e.g., the memory 420, the communication circuit 430, the audio interface 440, the sensor 450, and the battery 460, perform computation based on the received data, and transfer signals to control the other components to the other components. According to various embodiments, the processor 410 may operate based on instructions stored in the memory 420.

According to various embodiments, the memory 420 may store instructions to enable other components of the external wearable electronic device 400, e.g., the processor 410, the communication circuit 430, the audio interface 440, the sensor 450, and the battery 460, to perform designated operations. According to various embodiments, the memory 420 may store audio data obtained through the audio interface 440.

According to various embodiments, the communication circuit 430 may perform wireless communication with another electronic device (e.g., the wearable electronic device 300). According to various embodiments, the communication circuit 430 may transmit information obtained from the external wearable electronic device 400 to the wearable electronic device 300. The type of communication supported by the communication circuit 430 is not limited.

According to various embodiments, the audio interface 440 may include a plurality of microphones and one or more speakers. According to various embodiments, the plurality of microphones may include a microphone that faces toward the user's inner ear when the user wears the external wearable electronic device 400 and a microphone that faces away from the user when the user wears the external wearable electronic device 400. According to various embodiments, the audio interface 440 may obtain audio data through each of the plurality of microphones and may perform noise cancellation based on the audio data obtained through the plurality of microphones.

According to various embodiments, the sensor 450 may include a biometric sensor for detecting whether the user wears the external wearable electronic device 400. For example, the biometric sensor may include at least one of a heart rate sensor, a skin sensor, and a temperature sensor. According to various embodiments, the sensor 450 may include a geomagnetic sensor.

According to various embodiments, the external wearable electronic device 400 may receive a data transmission request from the wearable electronic device 300 through the communication circuit 430. For example, the external wearable electronic device 400 may receive a request to transmit the audio data received through the audio interface 440. According to an embodiment, when a designated condition (e.g., detection of a designated motion or a designated time) occurs from the wearable electronic device 300, the external wearable electronic device 400 may receive a request to transmit the audio data received through the audio module 440.

Figure 5:
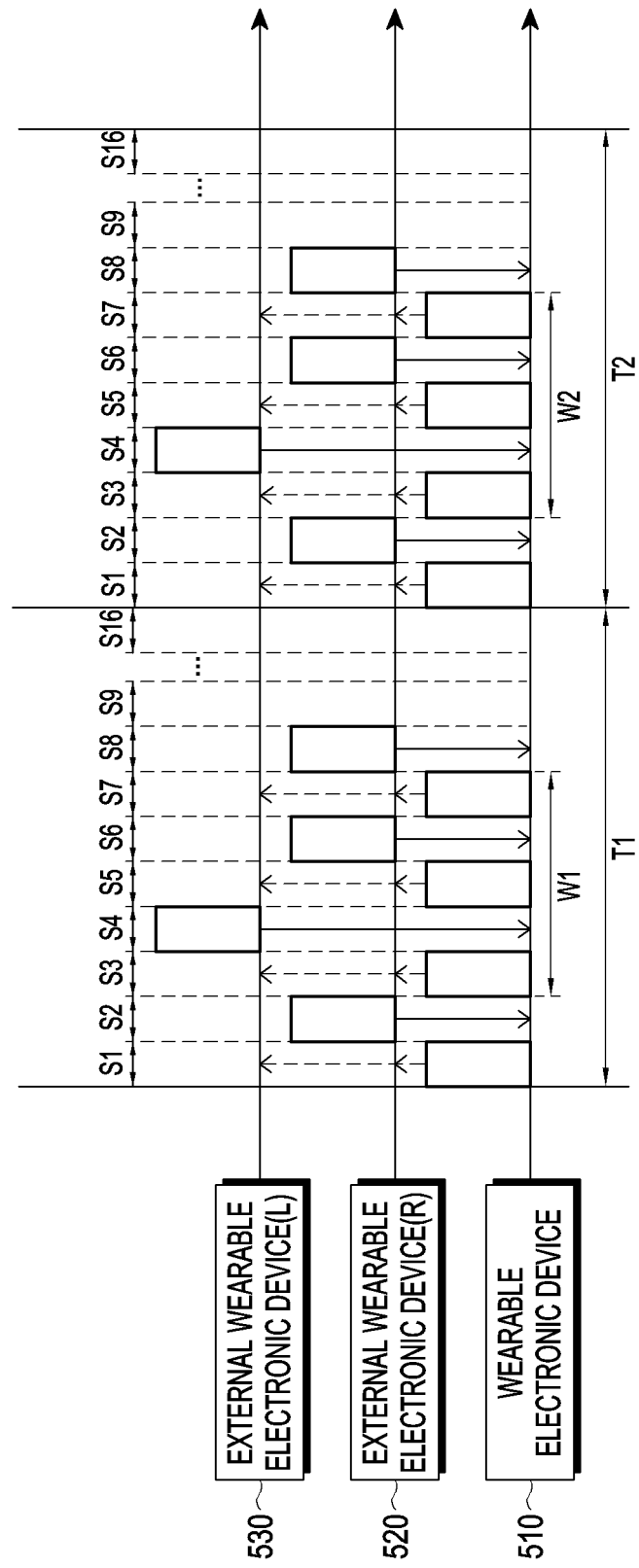
FIG. 5 illustrates communication between a wearable electronic device and an external wearable electronic device according to various embodiments.

FIG. 5 illustrates communication between a wearable electronic device and an external wearable electronic device according to various embodiments. FIG. 5 illustrates communication between a wearable electronic device 510, an external wearable electronic device (R) 520, and an external wearable electronic device (L) 530 in a case where the external wearable electronic device is an earphone-type wearable electronic device and includes the external wearable electronic device (L) 530 to be worn on the left ear and the external wearable electronic device (R) 520 to be worn on the right ear.

According to various embodiments, one of the external wearable electronic device (R) 520 and the external wearable electronic device (L) 530 may operate as a master, and the other may act as a slave. FIG. 5 illustrates an example in which the external wearable electronic device (R) 520 operates as a master, and the external wearable electronic device (L) 530 operates as a slave.

In FIG. 5, the wearable electronic device 510 and the external wearable electronic device (R) 520 may be connected to each other through the Bluetooth communication protocol, and the external wearable electronic device (R) 520 and the external wearable electronic device (L) 530 may be connected to each other through the Bluetooth communication protocol. According to various embodiments, the external wearable electronic device (R) 520 may perform communication with the wearable electronic device 510. The external wearable electronic device (L) 530 may receive information about the communication link between the wearable electronic device 510 and the external wearable electronic device (R) 520 from the external wearable electronic device (R) 520. According to various embodiments, the information about the communication link between the wearable electronic device 510 and the external wearable electronic device (R) 520 may include address information, clock information, channel information, session description protocol (SDP) result information, information about supported functions, key information, or an extended inquiry response (EIR) packet. The external wearable electronic device (L) 530 may monitor the communication channel between the wearable electronic device 510 and the external wearable electronic device (R) 520 based on the information about the communication link between the wearable electronic device 510 and the external wearable electronic device (R) 520. For example, the external wearable electronic device (L) 530 may receive the data transmitted/received through the communication channel between the wearable electronic device 510 and/or the external wearable electronic device (R) 520 by the wearable electronic device 510 and the external wearable electronic device (R) 520. As another example, the external wearable electronic device (L) 530 may transmit data to the wearable electronic device 510 through the communication channel between the wearable electronic device 510 and the external wearable electronic device (R) 520.

The wearable electronic device 510 may send a request for state information about the external wearable electronic device R 520 and the external wearable electronic device L 530, obtained by the external wearable electronic device R 520 and the external wearable electronic device L 530, to the external wearable electronic device R 520. Details of examples of the state information are described below with reference to FIG. 6. The wearable electronic device 510 may receive state information from the external wearable electronic device (R) 520. The state information obtained from the external wearable electronic device (L) 530 may be transmitted to the wearable electronic device 510 during retransmission periods between the external wearable electronic device (R) 520 and the wearable electronic device 510, indicated by W1 and W2 in FIG. 5.

Figure 6:
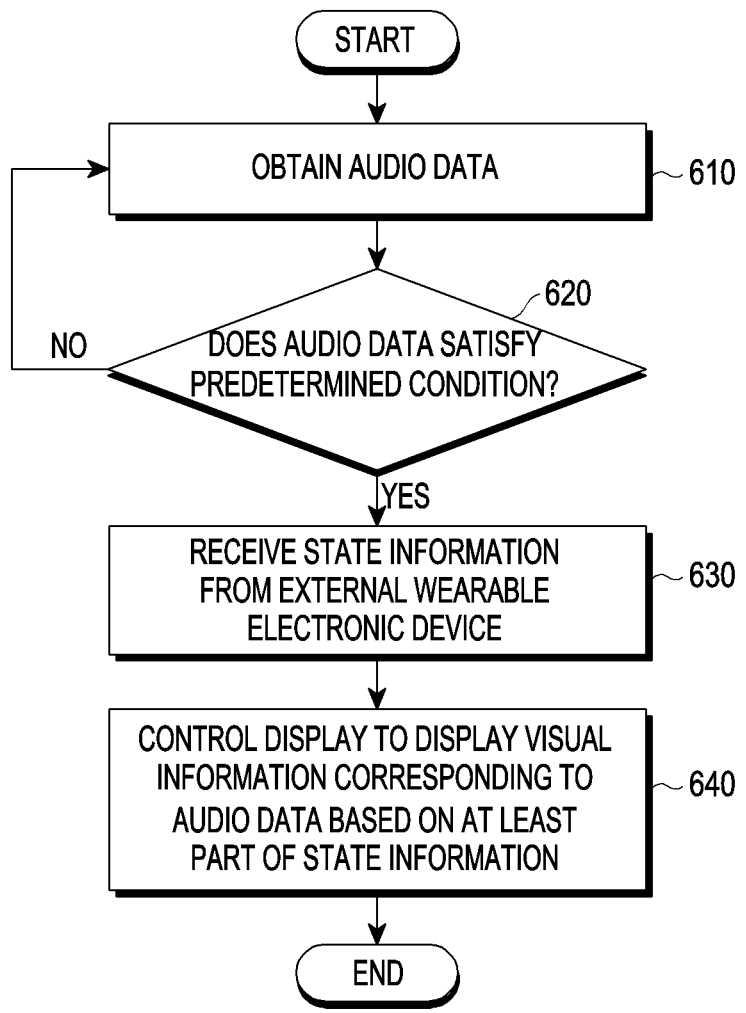
FIG. 6 is a flowchart illustrating operations performed in a wearable electronic device according to various embodiments.

FIG. 6 is a flowchart illustrating operations performed in a wearable electronic device according to various embodiments. According to an embodiment, when the user wears the wearable electronic device, the wearable electronic device (e.g., the wearable electronic device 300) may receive audio data generated around and may receive a request to activate the STT function which provides text and/or images based on the received audio data. According to another embodiment, when the user wears the wearable electronic device, the wearable electronic device 300 may automatically activate the STT function. According to another embodiment, when the user wears the wearable electronic device, the wearable electronic device 300 may determine whether the user is outputting audio data through another wearable electronic device (e.g., an earphone) and may activate the STT function based on the result of the determination.

According to an embodiment, in operation 610, the processor (e.g., the processor 320) of the wearable electronic device (e.g., the wearable electronic device 300) may obtain audio data. According to various embodiments, the processor 320 may obtain audio data through the audio interface 361 of the wearable electronic device 300.

In operation 620, the processor (e.g., the processor 320) of the wearable electronic device (e.g., the wearable electronic device 300) may identify whether the audio data obtained in operation 610 meets a predetermined condition. According to various embodiments, the predetermined condition may be met when the audio data indicates a situation in which the user of the wearable electronic device 300 may want to receive the STT function. For example, the predetermined condition may include at least one of when the audio data includes a language-related voice, when the audio data includes a preset word-related voice, or when the audio data includes a voice having a preset volume or higher. In embodiments, preset may mean, for example, predetermined, or determined at a previous time.

In operation 620, the processor (e.g., the processor 320) of the wearable electronic device (e.g., the wearable electronic device 300) may identify whether the obtained audio data meets the predetermined condition. In one example, when it is identified that the obtained audio data does not meet the predetermined condition in operation 620, the processor (e.g., the processor 320) of the wearable electronic device (e.g., the wearable electronic device 300) may repeat operation 610 until audio data meeting the predetermined condition is obtained.

In another example, if it is identified that the obtained audio data meets the predetermined condition in operation 620, the processor (e.g., the processor 320) of the wearable electronic device (e.g., the wearable electronic device 300) may receive state information from the external wearable electronic device (e.g., the external wearable electronic device 400) through the communication circuit 370 in operation 630. According to various embodiments, the state information may be information based on a signal obtained from the external wearable electronic device 400.

According to various embodiments, the state information may indicate whether the external wearable electronic device 400 is being worn by the user of the external wearable electronic device 400. According to various embodiments, the state information indicating whether the external wearable electronic device 400 is being worn by the user may be a biometric signal obtained from the sensor 450 of the external wearable electronic device 400 or information output based on the biometric signal obtained by the sensor 450, from the processor 410 of the external wearable electronic device 400 and may indicate the result of determining whether the external wearable electronic device 400 is being worn by the user.

According to various embodiments, the state information may indicate whether a voice is being output from the external wearable electronic device 400. According to various embodiments, the state information may indicate the volume of the voice being output from the external wearable electronic device 400.

According to various embodiments, in a case where the external wearable electronic device 400 provides a noise canceling function and ambient sound listening function and allows the user to set priority on the noise canceling function and the ambient sound listening function, the state information may indicate which one of the noise canceling function and the ambient sound listening function has a higher priority.

According to various embodiments, the state information may indicate whether the ambient sound listening function is active in the external wearable electronic device 400 by the user's input to the external wearable electronic device 400.

According to various embodiments, the state information may include audio data obtained through the audio interface 440 of the external wearable electronic device 400.

In operation 640, the processor (e.g., the processor 320) of the wearable electronic device (e.g., the wearable electronic device 300) may control the display (e.g., the display 350) to display visual information corresponding to the audio data based at least part of the state information. According to various embodiments, the visual information may include at least one of text or an image.

According to various embodiments, that the processor 320 controlling the display 350 to display visual information corresponding to audio data based at least part of the state information may mean that the processor 320 determines whether to provide the STT function based on at least part of the state information.

According to various embodiments, when the state information indicates that the external wearable electronic device 400 is being worn by the user of the external wearable electronic device 400, that the state information indicates that the external wearable electronic device 400 is being worn may be included in at least one condition for the processor 320 to control the display 350 to display the visual information corresponding to the audio data. In embodiments, the at least one condition for the processor 320 to control the display 350 to display the visual information corresponding to the audio data may be referred to as "at least one visual information display condition". In other words, the processor 320 may further have any of various conditions to be described below as conditions for providing the STT function in addition to a condition that the external wearable electronic device 400 is being worn. According to various embodiments, when the state information indicates that the external wearable electronic device 400 is not being worn, the processor 320 may not control the display 350 to display visual information corresponding to the audio data.

According to various embodiments, when the state information is a biometric signal obtained from the sensor 450 of the external wearable electronic device 400, the processor 320 may obtain a biometric signal through the sensor 380 of the wearable electronic device 300 and compare the biometric signal received from the external wearable electronic device 400 with the biometric signal obtained through the sensor 380 of the wearable electronic device 300, thereby identifying whether the user wearing the external wearable electronic device 400 is identical to the user wearing the wearable electronic device 300. According to various embodiments, the at least one visual information display condition may include a condition that the state information indicates that the external wearable electronic device 400 is being worn, and also a condition that that the user wearing the external wearable electronic device 400 is identical to the user wearing the wearable electronic device 300. According to various embodiments, when it is identified that the user wearing the external wearable electronic device 400 is not identical to the user wearing the wearable electronic device 300, the processor 320 may not control the display 350 to display the visual information corresponding to the audio data.

According to various embodiments, when the state information indicates whether the external wearable electronic device 400 is outputting a voice, the at least one visual information display condition may include a condition that the state information indicates that the external wearable electronic device 400 is outputting a voice.

According to various embodiments, when the state information indicates the volume of the voice being output from the external wearable electronic device 400, the at least one visual information display condition may include a condition that the volume of the voice being output from the external wearable electronic device 400, indicated by the state information, is a preset level or more.

According to various embodiments, when the state information indicates relative priorities between the noise canceling function and the ambient sound listening function, the at least one visual information display condition may include a condition that the priority of the noise canceling function indicated by the state information is higher than the priority of the ambient sound listening function.

According to various embodiments, when the state information indicates whether the ambient sound listening function is active in the external wearable electronic device 400 by the user's input to the external wearable electronic device 400, the at least one visual information display condition may include a condition that the ambient sound listening function is not activated by the user's input to the external wearable electronic device 400. In other words, when the user activates the ambient sound listening function through a direct input to the external wearable electronic device 400, the wearable electronic device 300 may not provide the STT function.

According to various embodiments, the processor 320 controlling the display 350 to display visual information corresponding to audio data based at least part of the state information may mean that the processor 320 considers the state information in determining the visual information to be provided, when the processor 320 provides the STT function.

According to various embodiments, when the state information includes audio data obtained through the audio interface 440 of the external wearable electronic device 400, the processor 320 may process the audio data obtained in operation 610 based on the audio data obtained through the audio interface 440 of the external wearable electronic device 400, thereby obtaining third audio data and controlling the display 350 to display visual information corresponding to the third audio data. According to various embodiments, the processing for obtaining the third audio data may be noise canceling processing for removing ambient noise except for voice conversations.

According to various embodiments, when providing the STT function, the processor 320 may adjust the visual feature of the visual information displayed on the display 350 according to the volume of the voice corresponding to the audio data obtained through the audio interface 440 of the external wearable electronic device 400, obtained as at least part of the state information and/or the audio data obtained in operation 610. For example, when the visual information is text, at least one of the font, size, or color of the text may be adjusted according to the volume of the voice corresponding to the audio data. As another example, when the visual information is an image, at least one of the size or color of the image may be adjusted according to the volume of the voice corresponding to the audio data.

Figure 7:
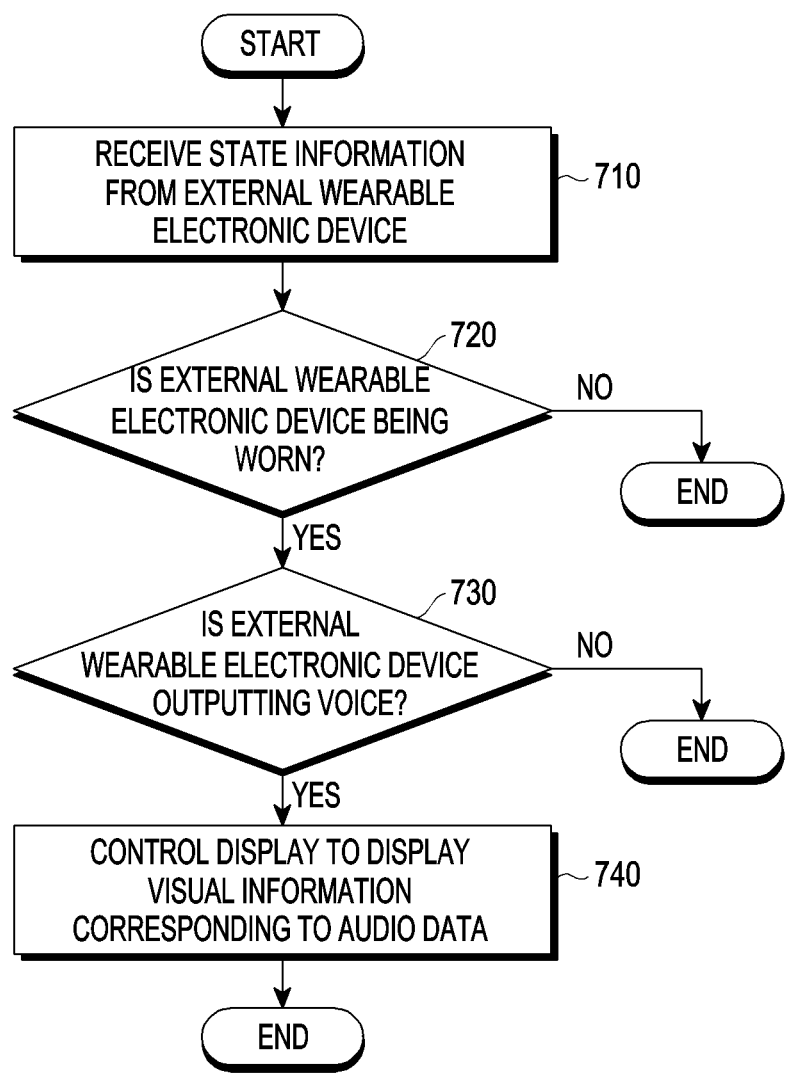
FIG. 7 is a flowchart illustrating operations performed in a wearable electronic device according to various embodiments.

FIG. 7 is a flowchart illustrating operations performed in a wearable electronic device according to various embodiments. According to an embodiment, a wearable electronic device (e.g., the wearable electronic device 300) may perform communication connection with an external wearable electronic device (e.g., the external wearable electronic device 400). For example, when the wearable electronic device 300 and the external wearable electronic device 400 are positioned in a short distance, the wearable electronic device 300 may perform communication connection (e.g., Bluetooth communication connection) with the external wearable electronic device through a communication circuit (e.g., the communication circuit 370).

According to an embodiment, in operation 710, the processor (e.g., the processor 320) of the wearable electronic device (e.g., the wearable electronic device 300) may receive state information from the external wearable electronic device (e.g., the external wearable electronic device 400). According to various embodiments, the state information may indicate whether the external wearable electronic device 400 is being worn by the user and whether a voice is being output from the external wearable electronic device 400.

In operation 720, the processor (e.g., the processor 320) of the wearable electronic device (e.g., the wearable electronic device 300) may identify whether the external wearable electronic device 400 is being worn by the user based on the state information. In one example, when it is identified that the external wearable electronic device 400 is not being worn by the user, the method may be terminated.

When it is identified that the external wearable electronic device 400 is being worn by the user in operation 720, the processor (e.g., the processor 320) of the wearable electronic device (e.g., the wearable electronic device 300) may identify whether a voice is being output from the external wearable electronic device 400 based on the state information in operation 730. In an example, when it is identified that the external wearable electronic device 400 is not outputting a voice, the method may be terminated.

When it is identified that the external wearable electronic device 400 is outputting a voice in operation 730, the processor (e.g., the processor 320) of the wearable electronic device (e.g., the wearable electronic device 300) may control the display 385 to display visual information corresponding to the audio data obtained through the audio interface 361 of the wearable electronic device 300 in operation 740. According to various embodiments, the visual information may include at least one of text or an image.

In embodiments, the order of operation 720 and operation 730 may be changed. For example, operation 730 may be performed before operation 720.

In embodiments, the processor (e.g., the processor 320) of the wearable electronic device (e.g., the wearable electronic device 300) may perform operations 610 and 620 of FIG. 6 before performing operation 710 and, in response to identifying that the audio data meets a predetermined condition in operation 620, perform operation 710. In other words, in addition to a condition that the external wearable electronic device 400 is being worn, and a condition that the external wearable electronic device 400 is outputting voice, conditions for providing the STT service, for example the at least one visual information display condition, may also include a condition related to the audio data.

Figure 8:
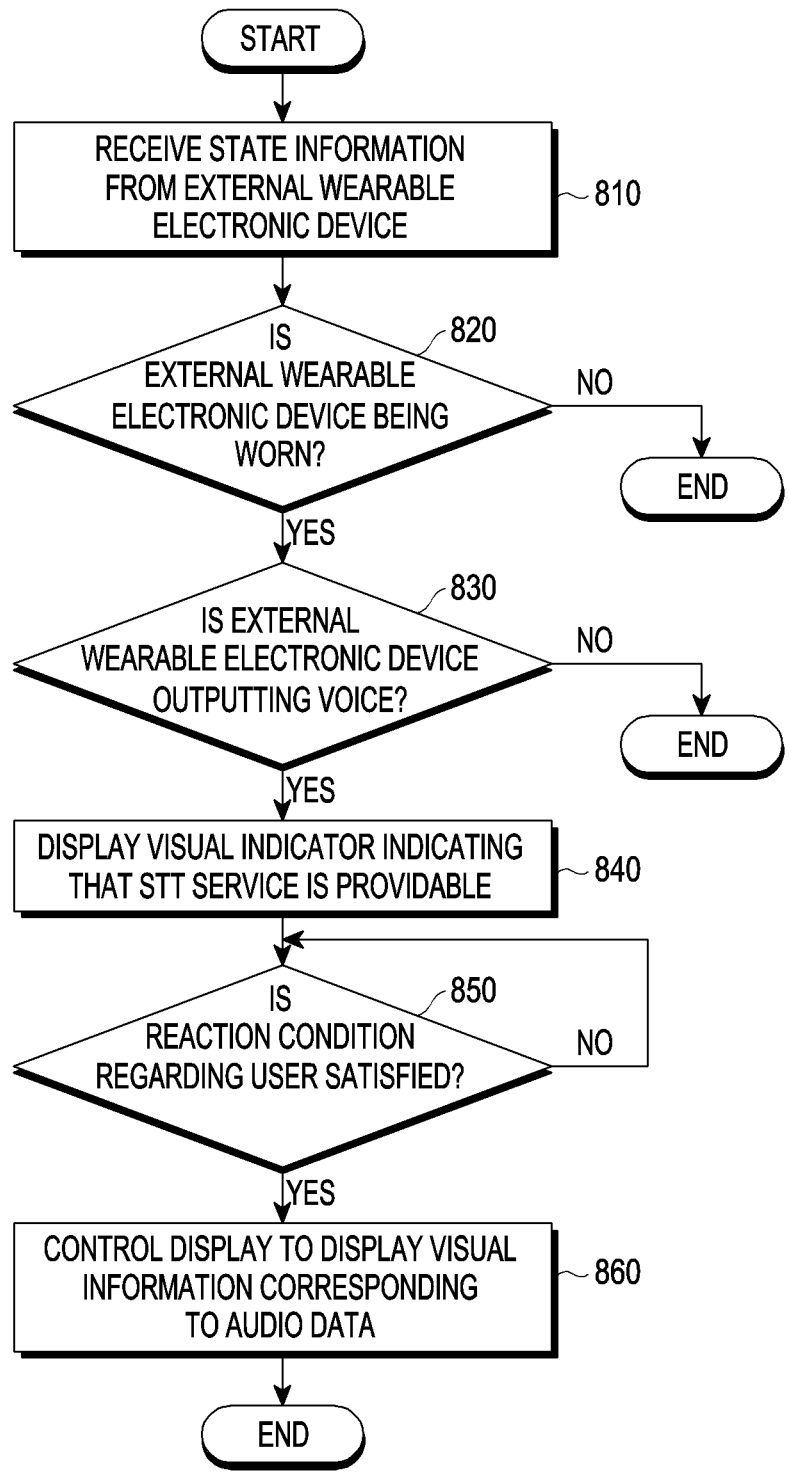
FIG. 8 is a flowchart illustrating operations performed in a wearable electronic device according to various embodiments.

FIG. 8 is a flowchart illustrating operations performed in a wearable electronic device according to various embodiments. In operation 810, the processor (e.g., the processor 320) of the wearable electronic device (e.g., the wearable electronic device 300) may receive state information from the external wearable electronic device (e.g., the external wearable electronic device 400). In operation 820, the processor (e.g., the processor 320) of the wearable electronic device (e.g., the wearable electronic device 300) may identify whether the external wearable electronic device 400 is being worn by the user based on the state information. In operation 830, the processor (e.g., the processor 320) of the wearable electronic device (e.g., the wearable electronic device 300) may identify whether the external wearable electronic device 400 is outputting a voice based on the state information. The details of operations 710, 720, and 730 described above in connection with FIG. 7 may be applied likewise to operations 810, 820, and 830.

When it is identified that the external wearable electronic device 400 is outputting a voice in operation 830, the processor (e.g., the processor 320) of the wearable electronic device (e.g., the wearable electronic device 300) may control the display 385 to display a visual indicator indicating that the STT service may be provided in operation 840. For example, the visual indicator may be a virtual object including text and/or image indicating that there is information to be provided to the user, based on the audio interface 440 included in the external wearable electronic device 400 and/or the audio input device 362 included in the wearable electronic device 300.

In operation 850, the processor (e.g., the processor 320) of the wearable electronic device (e.g., the wearable electronic device 300) may determine whether a reaction condition regarding the user of the wearable electronic device 300 is met. According to various embodiments, the reaction condition may be a condition related to the reaction of the user of the wearable electronic device 300 to the visual indicator displayed in operation 840. According to various embodiments, the processor 320 may identify the user's gaze through the second camera 312 and, if it is identified that the user's gaze is on the visual indicator for a preset first time or longer, may identify that the reaction condition is met. According to various embodiments, the processor 320 may analyze the user's utterance and, when a preset utterance for receiving the STT service is detected, may identify that the reaction condition is met. In this case, the processor 320 may store data related to the user's voice in the memory 340 and may identify whether the preset utterance is the user's utterance based on the stored user's voice data. According to various embodiments, the processor 320 may detect a gesture through the first camera 311 and, when a preset gesture for receiving the STT service is detected, may identify that the reaction condition is met. According to various embodiments, if any combination of the above-described example reaction conditions is met, the processor 320 may identify that the reaction condition is met.

In operation 850, when it is identified that the reaction condition is not met, the processor (e.g., the processor 320) of the wearable electronic device (e.g., the wearable electronic device 300) may repeat operation 850 until the reaction condition is met.

When it is identified that the reaction condition is met in operation 850, the processor (e.g., the processor 320) of the wearable electronic device (e.g., the wearable electronic device 300) may control the display 385 to display visual information corresponding to the audio data obtained through the audio interface 361 of the wearable electronic device 300 in operation 860 According to various embodiments, the visual information may include at least one of text or an image.

According to various embodiments, the processor 320 may store audio data gathered before the reaction condition is met in the memory 340 and, if it is identified that the reaction condition is met, control the display 385 to further display the visual information corresponding to the audio data gathered before the reaction condition is met, as well as the visual information corresponding to the audio data gathered after the reaction condition is met in operation 860.

In embodiments, the processor (e.g., the processor 320) of the wearable electronic device (e.g., the wearable electronic device 300) may perform operations 610 and 620 of FIG. 6 before performing operation 810 and, in response to identifying that the audio data meets a predetermined condition in operation 620, perform operation 810.

Figure 9:
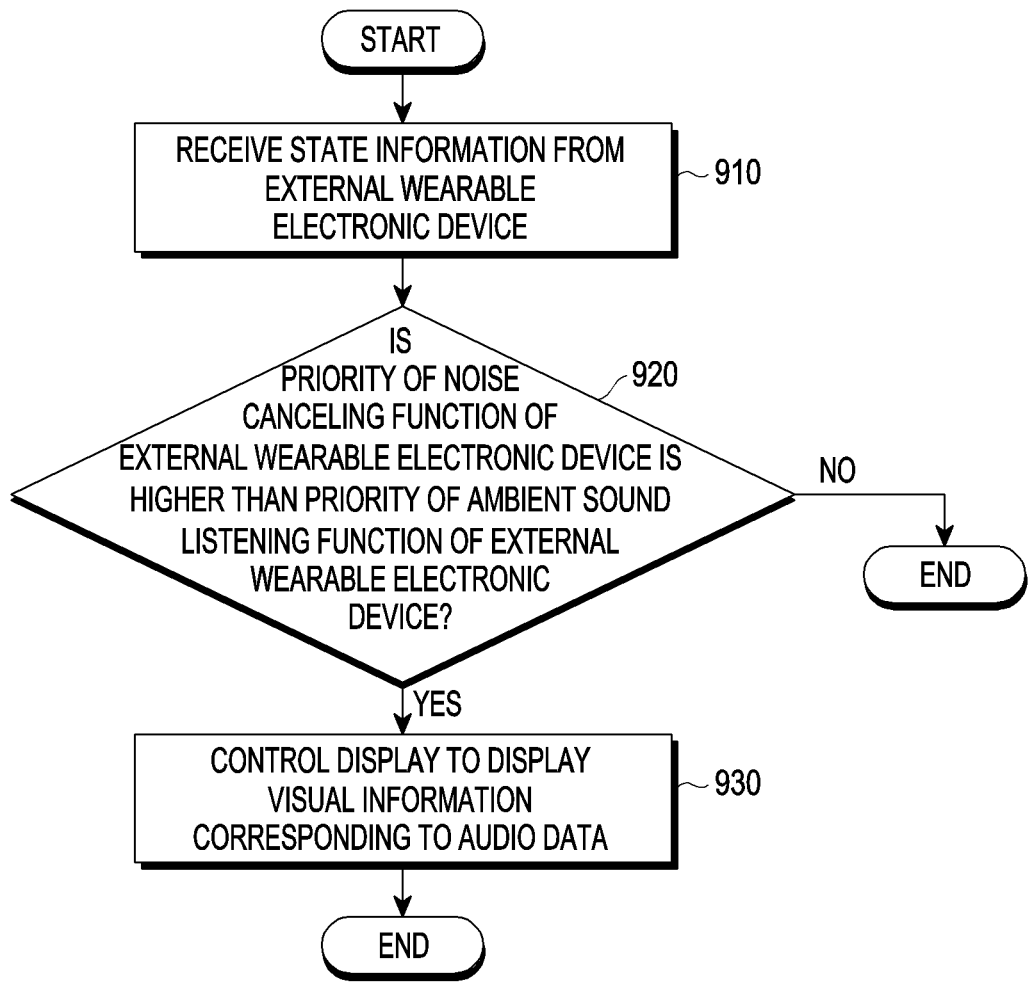
FIG. 9 is a flowchart illustrating operations performed in a wearable electronic device according to various embodiments.

FIG. 9 is a flowchart illustrating operations performed in a wearable electronic device according to various embodiments. In operation 910, the processor (e.g., the processor 320) of the wearable electronic device (e.g., the wearable electronic device 300) may receive state information from the external wearable electronic device (e.g., the external wearable electronic device 400). According to various embodiments, the state information may indicate which function of the noise canceling function and the ambient sound listening function is set to have a higher priority in the external wearable electronic device 400.

In operation 920, the processor (e.g., the processor 320) of the wearable electronic device (e.g., the wearable electronic device 300) may identify whether the priority of the noise canceling function of the external wearable electronic device 400 is higher than the priority of the ambient sound listening function based on the state information. For example, the priority of the ambient sound listening function of the external wearable electronic device 400 being higher than the priority of the noise canceling function of the external wearable electronic device 400 may mean that the user desires to listen to ambient sound through the external wearable electronic device 400 rather than receiving the STT function based on the external sound through the wearable electronic device 300.

According to an embodiment, the external wearable electronic device 400 may detect that the user activates the ambient sound listening function through detection of a designated motion or the user's utterance, or the user's input, such as a touch, tap, or long-press, through the sensor 450.

When it is determined that the priority of the noise canceling function of the external wearable electronic device 400 is higher than the priority of the ambient sound listening function in operation 920, the processor (e.g., the processor 320) of the wearable electronic device (e.g., the wearable electronic device 300) may control the display 385 to display visual information corresponding to the audio data obtained through the audio interface 361 of the wearable electronic device 300 in operation 930. According to various embodiments, the visual information may include at least one of text or an image.

If it is determined that the priority of the noise canceling function of the external wearable electronic device 400 is lower than the priority of the ambient sound listening function in operation 920, the processor (e.g., the processor 320) of the wearable electronic device (e.g., the wearable electronic device 300) may terminate the method.

Figure 12:
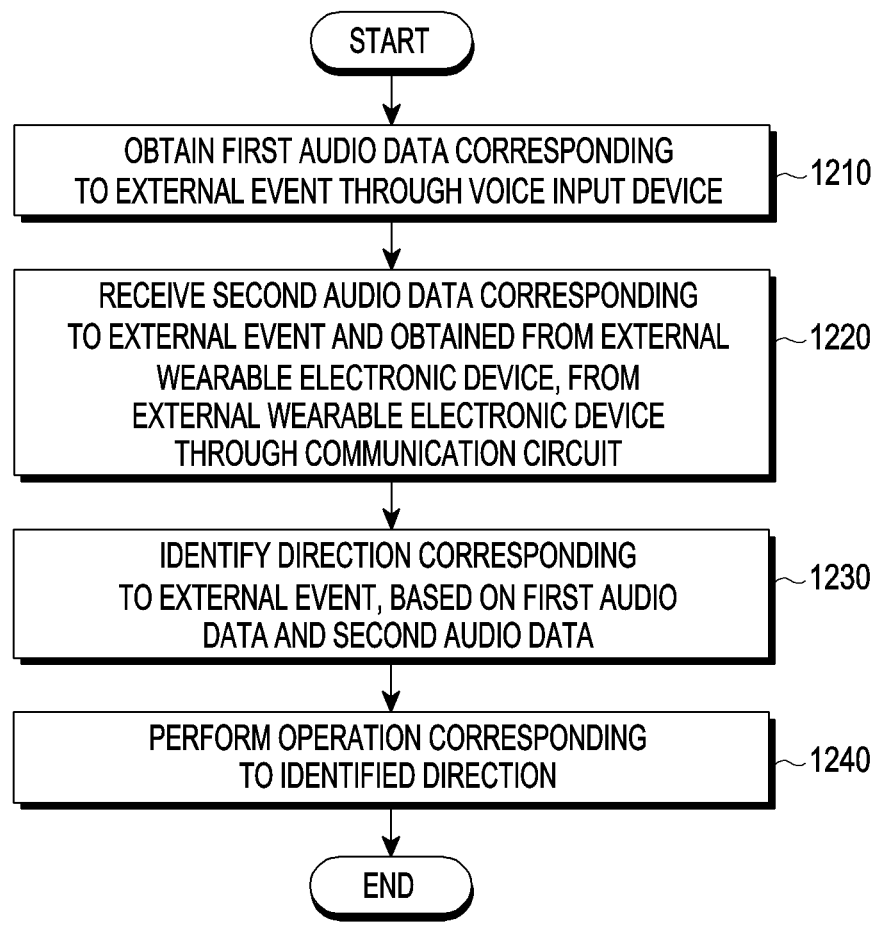
FIG. 12 is a flowchart illustrating operations performed in a wearable electronic device according to various embodiments.

In embodiments, when it is determined that the priority of the noise canceling function of the external wearable electronic device 400 is higher than the priority of the ambient sound listening function in operation 920, the processor (e.g., the processor 320) of the wearable electronic device (e.g., the wearable electronic device 300) may determine whether the condition for providing the STT function is met, as described below with reference to FIG. 12 and, when the condition of FIG. 12 is met, control the display 385 to display visual information corresponding to the audio data obtained through the audio interface 361 of the wearable electronic device 300 in operation 12.

In embodiments, the processor (e.g., the processor 320) of the wearable electronic device (e.g., the wearable electronic device 300) may perform operations 610 and 620 of FIG. 6 before performing operation 910 and, in response to identifying that the audio data meets a predetermined condition in operation 620, perform operation 910.

Figure 10:
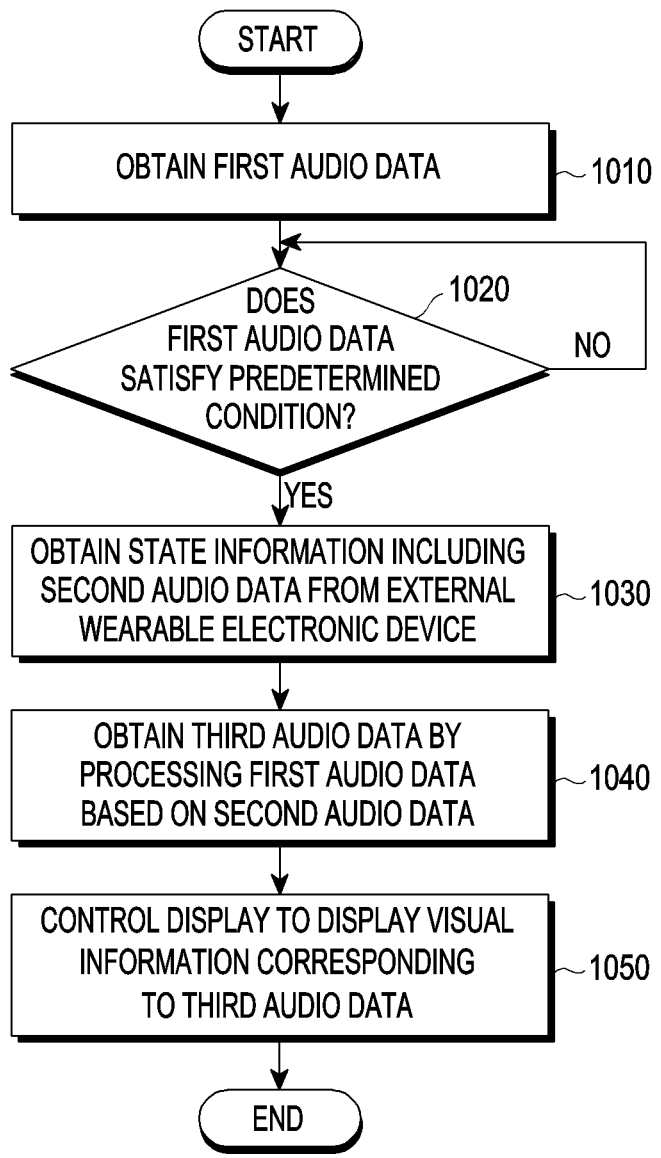
FIG. 10 is a flowchart illustrating operations performed in a wearable electronic device according to various embodiments.

FIG. 10 is a flowchart illustrating operations performed in a wearable electronic device according to various embodiments. In operation 1010, the processor (e.g., the processor 320) of the wearable electronic device (e.g., the wearable electronic device 300) may obtain first audio data. According to various embodiments, the processor 320 may obtain first audio data through the audio interface 361 of the wearable electronic device 300.

In operation 1020, the processor (e.g., the processor 320) of the wearable electronic device (e.g., the wearable electronic device 300) may identify whether the first audio data obtained in operation 1010 meets a predetermined condition. Details of the predetermined condition may be the same as those described above with reference to operation 620 of FIG. 6.

When it is identified that the obtained first audio data does not meet the predetermined condition in operation 1020, the processor (e.g., the processor 320) of the wearable electronic device (e.g., the wearable electronic device 300) may repeat operations 1010 and 1020 until first audio data meeting the predetermined condition is obtained.

In operation 1020, when it is identified that the first audio data meets the predetermined condition, the processor (e.g., the processor 320) of the wearable electronic device (e.g., the wearable electronic device 300) may obtain state information including second audio data obtained through the audio interface 440 of the external wearable electronic device 400, from the external wearable electronic device (e.g., the external wearable electronic device 400) in operation 1030. For example, the wearable electronic device 300 may transmit data including information (e.g., reception time information and/or sampling data) about the first audio data to the external wearable electronic device 400 and receive state information including the second audio data based on the information about the first audio data from the external wearable electronic device 400. According to an embodiment, before determining whether the first audio data meets the predetermined condition, the wearable electronic device 300 may perform communication connection with the external wearable electronic device 400 through the communication circuit 370 and obtain the state information including the second audio data from the external wearable electronic device 400.

In operation 1040, the processor (e.g., the processor 320) of the wearable electronic device (e.g., the wearable electronic device 300) may obtain third audio data by processing the first audio data based on the second audio data. According to various embodiments, in operation 1040, the processor 320 may perform noise canceling processing to remove ambient noise except for the voice conversations from the first audio data.

In operation 1050, the processor (e.g., the processor 320) of the wearable electronic device (e.g., the wearable electronic device 300) may control the display 350 to display the visual information corresponding to the third audio data obtained in operation 1040. According to various embodiments, the visual information may include at least one of text or an image.

In embodiments, the processor 320 may receive state information indicating whether the external wearable electronic device 400 is being worn by the user and whether the external wearable electronic device 400 is outputting a voice in operation 1030 and, without immediately performing operation 1040 after performing operation 1030, perform operations 720 and 730 of FIG. 7 and, when the conditions of operations 720 and 730 are met, perform operation 1040.

Further, according to various embodiments, the processor 320 may receive state information indicating whether the external wearable electronic device 400 is being worn by the user and whether the external wearable electronic device 400 is outputting a voice in operation 1030 and, without immediately performing operation 1040 after performing operation 1030, perform operations 820 to 850 of FIG. 8 and, when the conditions of operations 820, 830, and 850 are met, perform operation 1040.

Figure 11:
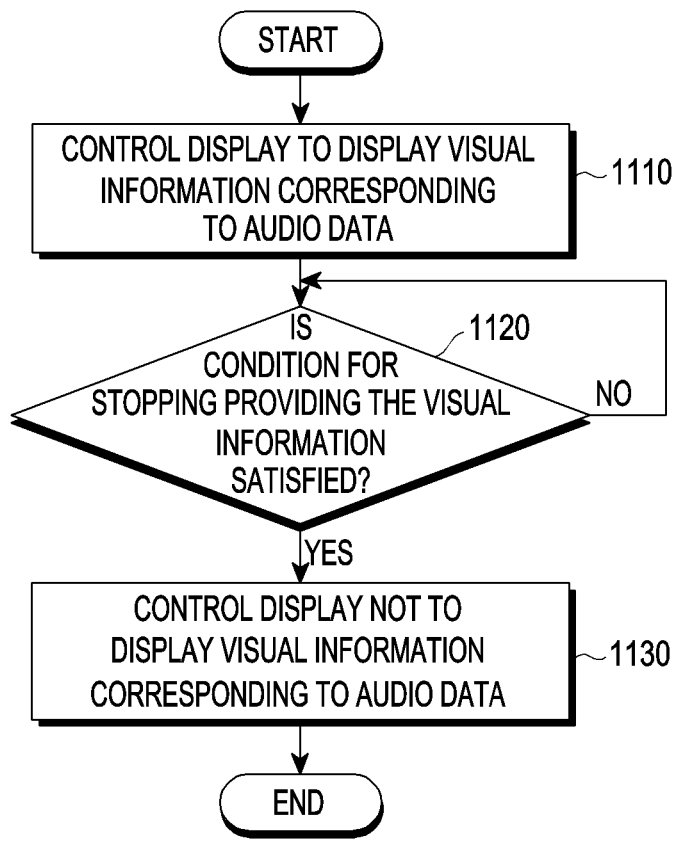
FIG. 11 is a flowchart illustrating operations performed in a wearable electronic device according to various embodiments.

FIG. 11 is a flowchart illustrating operations performed in a wearable electronic device according to various embodiments. In operation 1110, the processor (e.g., the processor 320) of the wearable electronic device (e.g., the wearable electronic device 300) may control the display 350 to display visual information corresponding to the audio data obtained through the audio interface 361 of the wearable electronic device 300. According to various embodiments, the visual information may include at least one of text or an image.

In operation 1120, the processor (e.g., the processor 320) of the wearable electronic device (e.g., the wearable electronic device 300) may identify whether a condition for stopping the providing of visual information is met. According to various embodiments, the condition for stopping providing visual information may be a condition indicating that it is appropriate to stop providing the STT service. According to various embodiments, the condition for stopping providing visual information may include a condition that the user's gaze is not on the visual information displayed in operation 1110 for greater than or equal to a preset time. According to various embodiments, the condition for stopping providing visual information may include a condition of detecting a preset gesture to request to stop the STT service by the user. According to various embodiments, the condition for stopping providing visual information may include a condition that the accuracy of sentences included in the visual information displayed in operation 1110 is less than or equal to a preset level. For example, the accuracy of sentences included in the visual information may be determined based on the completeness of the sentences and/or the accuracy of the context. According to various embodiments, the condition for stopping providing visual information may include a condition that the visual information displayed in operation 1110 is displayed for greater than a designated time.

In operation 1120, when it is identified that the condition for stopping providing visual information is met in operation 1120, the processor (e.g., the processor 320) of the wearable electronic device (e.g., the wearable electronic device 300)

may control the display 350 not to display the visual information corresponding to the audio data in operation 1130.

When it is identified that the condition for stopping providing visual information is not met in operation 1120, the processor (e.g., the processor 320) of the wearable electronic device (e.g., the wearable electronic device 300) may repeat operation 1120 until the condition for stopping providing visual information is identified to be met while controlling the display 350 to continue to display the visual information corresponding to the audio data obtained through the audio interface 361.

In embodiments, when the condition for stopping providing visual information includes the condition that the accuracy of sentences included in the visual information displayed in operation 1110 is less than or equal to a preset level, and the accuracy of sentences included in the visual information is identified to be less than or equal to the preset level in operation 1120, the processor (e.g., the processor 320) of the wearable electronic device (e.g., the wearable electronic device 300) may transmit a signal for activating the ambient sound listening function to the external wearable electronic device 400 through the communication circuit 370.

FIG. 12 is a flowchart illustrating operations performed in a wearable electronic device according to various embodiments. In operation 1210, the processor (e.g., the processor 320) of the wearable electronic device (e.g., the wearable electronic device 300) may obtain first audio data corresponding to an external event through the audio input device 362 of the wearable electronic device 300. According to various embodiments, the external event may include an utterance by a person other than the user of the wearable electronic device 300. For example, the external event may include generation of a sound corresponding to a designated condition for example a sound having a signal strength larger than or equal to a designated signal strength, from the outside, for example an outside of any of wearable electronic devices 100, 200, or 300.

In operation 1220, the processor (e.g., the processor 320) of the wearable electronic device (e.g., the wearable electronic device 300) may receive second audio data corresponding to the external event and obtained from the external wearable electronic device 400, from the external wearable electronic device (e.g., the external wearable electronic device 400) through the communication circuit 370.

In operation 1230, the processor (e.g., the processor 320) of the wearable electronic device (e.g., the wearable electronic device 300) may identify the direction corresponding to the external event, based on the first audio data and the second audio data. According to an embodiment, the processor 320 of the wearable electronic device 300 may determine the direction corresponding to the external event based on the position of at least one audio interface 440 of the external wearable electronic device 400 and the position of at least one audio input device 362 of the wearable electronic device 300. For example, the processor 320 may determine the direction corresponding to the external event based on time information about reception of the first audio data and time information about reception of the second audio data. According to various embodiments, the direction corresponding to the external event may be a relative direction of the position where the external event occurs, relative to the wearable electronic device 300.

In operation 1240, the processor (e.g., the processor 320) of the wearable electronic device (e.g., the wearable electronic device 300) may perform the operation corresponding to the identified direction.

According to various embodiments, the processor 320 may identify the gaze direction, of the user of the wearable electronic device 300, or the direction in which the user views through the transparent member (e.g., one or more transparent members 190-1 and 190-2) of the wearable electronic device 300, based on the data obtained through the sensor 380 and/or at least one camera (e.g., the first camera 311 or the second camera 312) of the wearable electronic device 300 and perform different operations depending on whether the identified user's gaze direction is identical to the direction identified in operation 1230. According to various embodiments, the processor 320 may identify the gaze direction of the user of the wearable electronic device 300 based on data obtained through the second camera 312. According to various embodiments, the processor 320 may identify the direction in which the wearable electronic device 300 faces based on the data obtained through the sensor 380 of the wearable electronic device 300 and identify the identified direction as the user's gaze direction. According to various embodiments, when the user's gaze direction is identical to the direction corresponding to the external event identified in operation 1230, the processor 320 may transmit a signal for activating the ambient sound listening function to the external wearable electronic device 400 through the communication circuit 370. According to various embodiments, when the user's gaze direction is not identical to the direction identified in operation 1230, the processor 320 may control the display 350 to display the visual information corresponding to the external event based on at least one of the first audio data or the second audio data.

Figure 13:
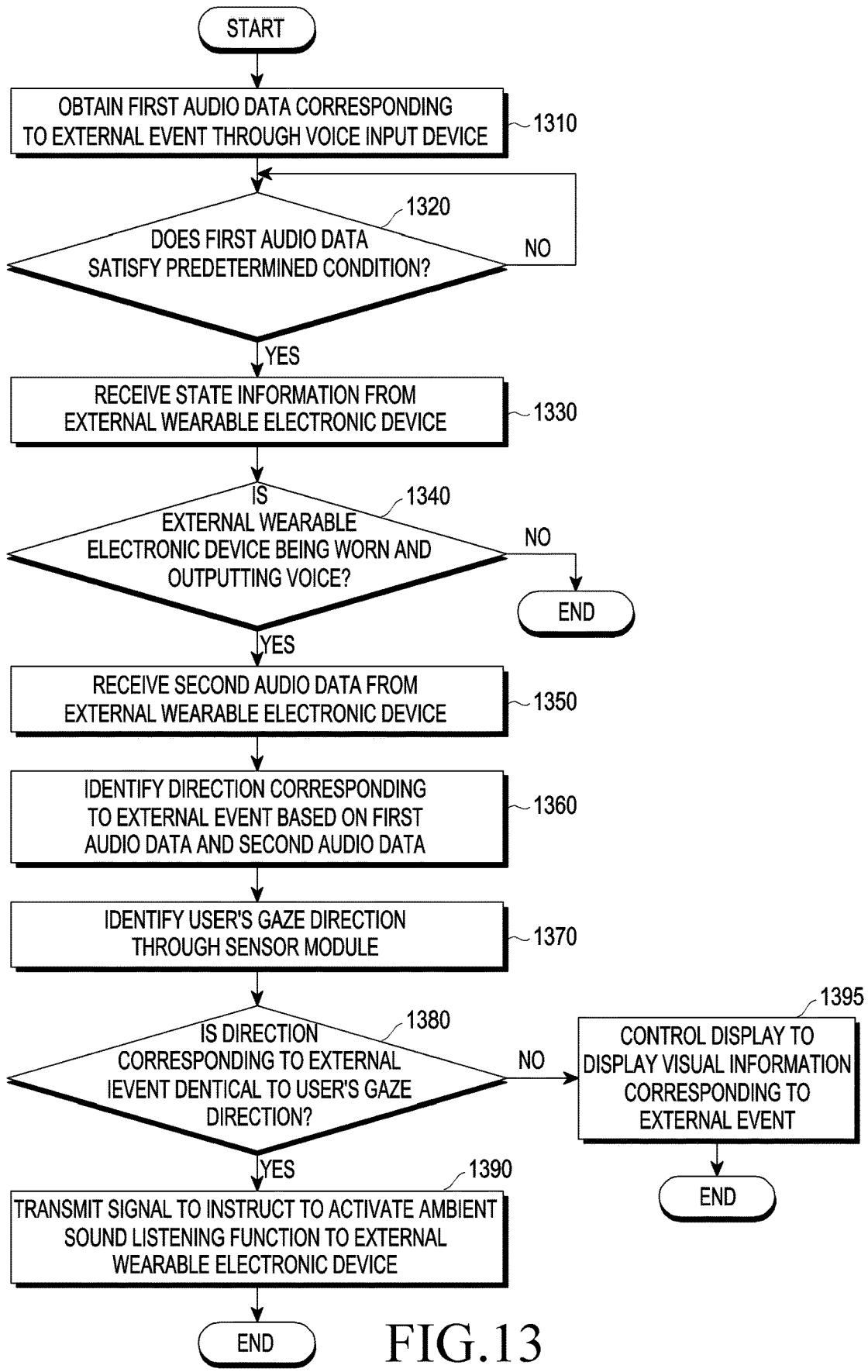
FIG. 13 is a flowchart illustrating operations performed in a wearable electronic device according to various embodiments.

FIG. 13 is a flowchart illustrating operations performed in a wearable electronic device according to various embodiments. In operation 1310, the processor (e.g., the processor 320) of the wearable electronic device (e.g., the wearable electronic device 300) may obtain first audio data corresponding to an external event through the audio input device 362 of the wearable electronic device 300.

In operation 1320, the processor (e.g., the processor 320) of the wearable electronic device (e.g., the wearable electronic device 300) may identify whether the first audio data meets a predetermined condition. Details of the predetermined condition may be the same as those described above with reference to operation 620 of FIG. 6.

When it is identified that the obtained first audio data does not meet the predetermined condition in operation 1320, the processor (e.g., the processor 320) of the wearable electronic device (e.g., the wearable electronic device 300) may repeat operations 1310 and 1320 until first audio data meeting the predetermined condition is obtained.

If it is identified that the first audio data meets the predetermined condition in operation 1320, the processor (e.g., the processor 320) of the wearable electronic device (e.g., the wearable electronic device 300) may receive state information from the external wearable electronic device (e.g., the external wearable electronic device 400). According to various embodiments, the state information may indicate whether the external wearable electronic device 400 is being worn by the user and whether a voice is being output from the external wearable electronic device 400, and the state information may include the second audio data obtained through the audio interface 440 of the external wearable electronic device 400. According to an embodiment, the wearable electronic device 300 may perform a communication connection with the external wearable electronic device 400 through the communication circuit 370 before determining whether the first audio data meets a predetermined condition. For example, the communication may include short-range communication, such as Bluetooth or Wi-Fi.

In operation 1340, the processor (e.g., the processor 320) of the wearable electronic device (e.g., the wearable electronic device 300) may identify whether the external wearable electronic device 400 is being worn and whether the external wearable electronic device 400 is outputting a voice based on the state information. According to various embodiments, as described above in connection with operation 640 of FIG. 6, in operation 1340, the processor 320 may further identify whether the user wearing the external wearable electronic device 400 is identical to the user wearing the wearable electronic device 300 and, when it is identified that the user wearing the external wearable electronic device 400 is identical to the user wearing the wearable electronic device 300, perform operation 1350. According to an embodiment, in operation 1340, the processor 320 may terminate the method when the external wearable electronic device 400 is not worn or is not outputting a voice.

When it is identified in operation 1340 that the external wearable electronic device 400 is worn and the external wearable electronic device 400 is outputting a voice, the processor (e.g., the processor 320) of the wearable electronic device (e.g., the wearable electronic device 300) may receive the second audio data obtained through the audio interface 440 of the external wearable electronic device 400 from the external wearable electronic device (e.g., the external wearable electronic device 400) through the communication circuit 370 in operation 1350.

In operation 1360, the processor (e.g., the processor 320) of the wearable electronic device (e.g., the wearable electronic device 300) may identify the direction corresponding to the external event, based on the first audio data and the second audio data. The details of operation 1230 may be likewise applied to operation 1360.

In operation 1370, the processor (e.g., the processor 320) of the wearable electronic device (e.g., the wearable electronic device 300) may identify the user's gaze direction, or the direction in which the user views through the transparent member (e.g., one or more transparent members 190-1 and 190-2 of FIG. 1) of the wearable electronic device 300, based on the data obtained through at least one of the sensor 380 or the second camera 312. According to various embodiments, the processor 320 may identify the gaze direction of the user of the wearable electronic device 300 based on data obtained through the second camera 312. According to various embodiments, the processor 320 may identify the direction in which the wearable electronic device 300 faces based on the data obtained through the sensor 380 of the wearable electronic device 300 and identify the identified direction as the user's gaze direction.

In operation 1380, the processor (e.g., the processor 320) of the wearable electronic device (e.g., the wearable electronic device 300) may identify whether the direction corresponding to the external event is identical to the user's gaze direction.

When it is identified in operation 1380 that the direction corresponding to the external event is identical to the user's gaze direction, the processor (e.g., the processor 320) of the wearable electronic device (e.g., the wearable electronic device 300) may transmit a signal for activating the ambient sound listening function to the external wearable electronic device 400 through the communication circuit 370 in operation 1390.

When it is identified in operation 1380 that the direction corresponding to the external event is not identical to the user's gaze direction, the processor (e.g., the processor 320) of the wearable electronic device (e.g., the wearable electronic device 300) may control the display 350 to display the visual information corresponding to the external event based on at least one of the first audio data or the second audio data in operation 1395. According to various embodiments, the visual information may include at least one of text or an image.

Figure 14:
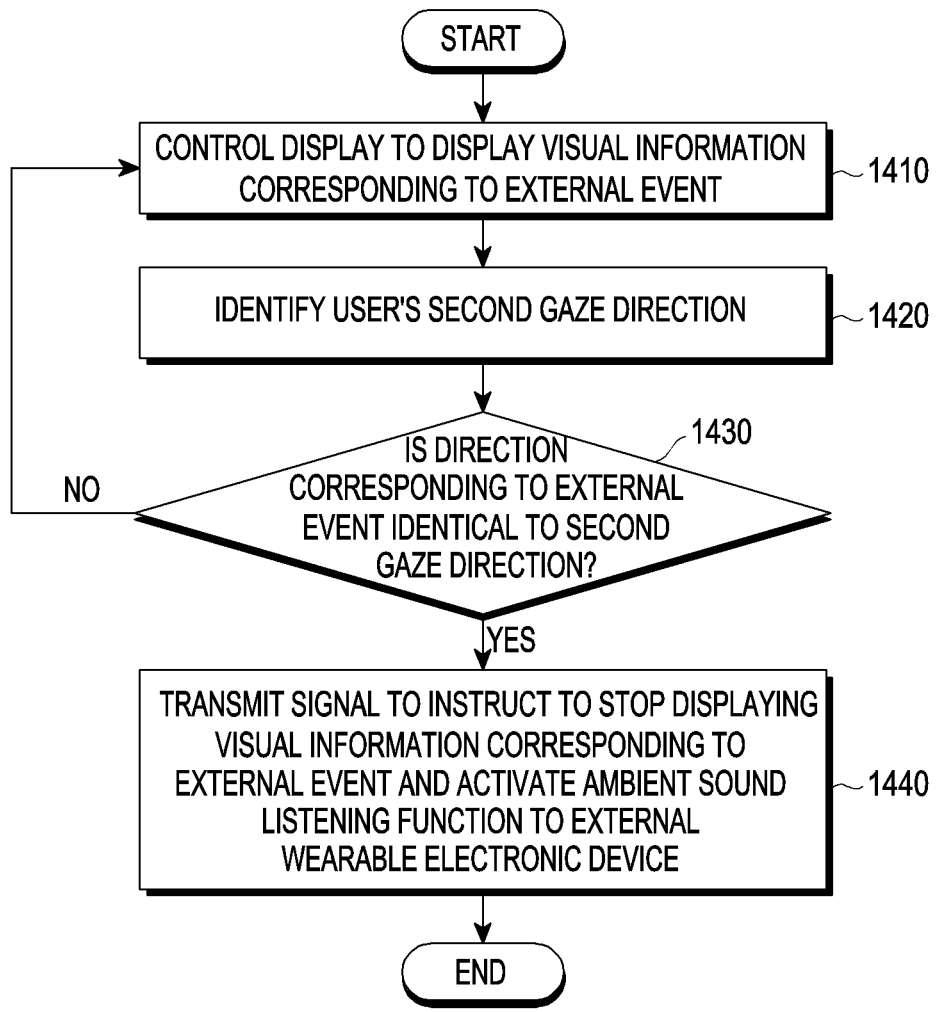
FIG. 14 is a flowchart illustrating operations performed in a wearable electronic device according to various embodiments.

FIG. 14 is a flowchart illustrating operations performed in a wearable electronic device according to various embodiments. According to an embodiment, the user wears the wearable electronic device 300 and the external wearable electronic device 400 and configures it to activate the STT function and display visual information corresponding to the external event. In operation 1410, the processor (e.g., the processor 320) of the wearable electronic device (e.g., the wearable electronic device 300) may control the display 350 to display the visual information corresponding to the external event. For example, the processor 320 may display, on the display 350, visual information based on the third audio data which is based on the first audio data received from the wearable electronic device 300 and the second audio data received from the external wearable electronic device 400. According to various embodiments, the visual information may include at least one of text or an image.

In operation 1420, the processor (e.g., the processor 320) of the wearable electronic device (e.g., the wearable electronic device 300) may identify the user's second gaze direction. A process of identifying the user's second gaze direction may be identical to operation 1370 of FIG. 13. Here, the term 'second gaze direction' may mean the user's gaze direction while the visual information corresponding to the external event is displayed, i.e., while the STT function is provided. The term 'second gaze direction' may be different from the gaze direction in operation 1370 of FIG. 13, that is, the user's gaze direction before the STT function is provided, which may be for example a first gaze direction.

In operation 1430, the processor (e.g., the processor 320) of the wearable electronic device (e.g., the wearable electronic device 300) may identify whether the user's second gaze direction is identical to the direction corresponding to the external event. According to various embodiments, similar to operation 1360 of FIG. 13, the processor 320 may identify the direction corresponding to the external event based on the second audio data received from the external wearable electronic device 400 and the first audio data obtained through the audio input device 362.

When it is identified in operation 1430 that the user's second gaze direction is not identical to the direction corresponding to the external event, the processor (e.g., the processor 320) of the wearable electronic device (e.g., the wearable electronic device 300) may continuously provide the STT function while repeating operations 1410 to 1430 until it is identified that the user's second gaze direction is identical to the direction corresponding to the external event.

When it is identified in operation 1430 that the user's second gaze direction is identical to the direction corresponding to the external event, the processor (e.g., the processor 320) of the wearable electronic device (e.g., the wearable electronic device 300) may control the display 350 to stop displaying the visual information corresponding to the external event and transmit a signal for activating the ambient sound listening function to the external wearable electronic device 400 through the communication circuit 370 in operation 1440.

According to various embodiments, a wearable electronic device (e.g., the wearable electronic device 300) may include a display (e.g., the display 350), a communication circuit (e.g., the communication circuit 370), a voice input device (e.g., the audio input device 362), and a processor (e.g., the processor 320) operatively connected with the display, the communication circuit, and the voice input device. The processor 320 may be configured to obtain audio data through the audio input device 362, identify whether the audio data satisfies a predetermined condition, receive, from an external wearable electronic device (e.g., the external wearable electronic device 400) through the communication circuit 370, state information based on a signal obtained from the external wearable electronic device 400, and control the display 350 to display visual information corresponding to the audio data, based on at least part of the state information.

According to various embodiments, the predetermined condition may include at least one of a condition in which the audio data includes a language-related voice, a condition in which the audio data includes a preset word-related voice, or a condition in which the audio data includes a voice having a volume greater than or equal to a preset volume.

According to various embodiments, the state information may indicate whether the external wearable electronic device 400 is being worn by a user.

According to various embodiments, the state information may include first data obtained from a first biometric sensor (e.g., the sensor 380) of the external wearable electronic device 400. The wearable electronic device 300 may include a second biometric sensor (e.g., the sensor 380). The processor 320 may be configured to obtain second data through the second biometric sensor, identify that the user wearing the external wearable electronic device is wearing the wearable electronic device 400, based on the first data and the second data, and control the display 350 to display the visual information corresponding to the audio data, based on identifying that the user wearing the external wearable electronic device 400 is wearing the wearable electronic device 300.

According to various embodiments, the state information may indicate whether the external wearable electronic device 400 is outputting a voice. The processor 320 may be configured to control the display to display 350 the visual information corresponding to the audio data, based on identifying that the external wearable electronic device 400 is being worn by the user and the external wearable electronic device 400 is outputting the voice.

According to various embodiments, the processor 320 may be configured to control the display 350 to display a visual indicator indicating that a speech to text (STT) service is providable, based on identifying that the external wearable electronic device 400 is being worn by the user, and the external wearable electronic device 400 is outputting the voice, and control the display 350 to display the visual information corresponding to the audio data, in response to a reaction condition regarding the user being satisfied while the visual indicator is displayed on the display 350.

According to various embodiments, the reaction condition may include at least one of a condition in which the user's gaze is on the visual indicator for a time greater than or equal to a preset first time, a condition in which a preset utterance by the user is detected, or a condition in which a preset first gesture by the user is detected.

According to various embodiments, the processor 320 may be configured to control the display 350 to further display the visual information corresponding to the audio data before the reaction condition is satisfied.

According to various embodiments, the state information may indicate that a priority of a noise canceling function of the external wearable electronic device 400 is higher than a priority of an ambient sound listening function of the external wearable electronic device 400. The processor 320 may be configured to control the display 350 to display the visual information corresponding to the audio data, based on identifying that the priority of the noise canceling function of the external wearable electronic device 400 is higher than the priority of the ambient sound listening function of the external wearable electronic device 400.

According to various embodiments, the state information may include second audio data obtained from the external wearable electronic device 400.

According to various embodiments, the processor 320 may be configured to obtain third audio data by processing the audio data based on the second audio data and control the display 350 to display visual information corresponding to the third audio data.

According to various embodiments, the processor 320 may be configured to adjust a visual feature of the visual information displayed on the display 350 according to a volume of a voice corresponding to the audio data.

According to various embodiments, the processor 320 may be configured to identify whether a condition for stopping providing the visual information is satisfied while controlling the display 350 to display the visual information corresponding to the audio data and control the display 350 not to display the visual information corresponding to the audio data, based on the condition for stopping providing the visual information being satisfied. The condition for stopping providing the visual information may include at least one of a condition in which a time during which the user's gaze is not on the visual information displayed on the display 350 lasts for a time greater than or equal to a preset second time, a condition in which a preset second gesture by the user is detected, or a condition in which an accuracy of sentences included in the visual information corresponding to the audio data is a level less than or equal to a preset level.

According to various embodiments, the wearable electronic device 300 may be communication-connected with an external electronic device (e.g., a smartphone) through the communication circuit 370, and the external wearable electronic device 400 may be communication-connected with an external electronic device through the communication circuit 430.

According to an embodiment, the wearable electronic device 300 may transmit, to the external electronic device through the communication circuit 370, the data received through at least one camera (e.g., the first camera 111-1 or 111-2, the second camera 112-1 or 112-2, and/or the third camera 113) or one or more audio input devices 162-1, 162-2, and 162-3. According to an embodiment, the wearable electronic device 300 may output visual information through at least one display (e.g., the first display 151, the second display 152, or the display 350) or output a voice through at least one audio output device 363, based on the data received from the external electronic device.

According to an embodiment, the external electronic device may obtain audio data from the wearable electronic device 300 and/or the external wearable electronic device 400 and provide an STT function based on the obtained audio data. According to an embodiment, the external electronic device may include at least one or more audio input device. The external electronic device may obtain audio data corresponding to an external event through the audio input device. When the audio data corresponding to the external event meets a designated condition, the external electronic device may request the wearable electronic device 300 and/or the external wearable electronic device 400 to transmit audio data. The external electronic device may obtain audio data from the wearable electronic device 300 and/or the external wearable electronic device 400 and provide an STT function based on the obtained audio data.

According to an embodiment, the external electronic device may receive first audio data through the wearable electronic device 300 and receive second audio data through the external wearable electronic device 400. According to an embodiment, the external electronic device may generate third audio data based on the first audio data and the second audio data and transmit visual information, based on the generated third audio data, to the wearable electronic device 300 to be output.

According to an embodiment, the external electronic device may receive a redirection of the user's gaze to a direction corresponding to the external event, from the external wearable electronic device 400 and/or the wearable electronic device 300 while outputting the visual information based on the third audio data through the wearable electronic device 300. For example, the wearable electronic device 300 may transmit, to the external electronic device, the data obtained from at least one camera (e.g., the first camera 111-1 or 111-2, the second camera 112-1 or 112-2, and/or the third camera 113) and/or the sensor 380. As another example, the external wearable electronic device 400 may transmit the data obtained from the sensor 450 to the external electronic device.

According to an embodiment, the external electronic device may identify a redirection of the user's gaze to the direction corresponding to the external event based on the data received from the external wearable electronic device 400 and/or the wearable electronic device 300. According to an embodiment, when the user's gaze is redirected to the direction corresponding to the external event, the external electronic device may request the wearable electronic device 300 to stop outputting the visual information through the display 350 and request the external wearable electronic device 400 to activate the ambient sound listening function.

According to various embodiments, a wearable electronic device (e.g., the wearable electronic device 300) may include a display (e.g., the display 350), a communication circuit (e.g., the communication circuit 370), a voice input device (e.g., the audio input device 362), and a processor (e.g., the processor 320) operatively connected with the display 350, the communication circuit 370, and the audio input device 362. The processor 320 may be configured to obtain first audio data corresponding to an external event through the audio input device 362, receive, from an external wearable electronic device (e.g., the external wearable electronic device 400) through the communication circuit 370, second audio data corresponding to the external event and obtained from the external wearable electronic device 400, identify a direction corresponding to the external event, based on the first audio data and the second audio data, and perform an operation corresponding to the identified direction.

According to various embodiments, the processor 320 may be configured to receive second audio data based on the first audio data satisfying a predetermined first condition. The predetermined condition may include at least one of a condition in which the first audio data includes a language-related voice, a condition in which the first audio data includes a preset word-related voice, or a condition in which the first audio data includes a voice having a volume greater than or equal to a preset volume.

According to various embodiments, the processor 320 may be configured to receive state information from the external wearable electronic device 400 through the communication circuit 370 and receive the second audio data, based on the state information indicating that the external wearable electronic device 400 is being worn and outputting a voice.

According to various embodiments, the wearable electronic device 300 may further include a sensor module (e.g., the sensor 380). The processor 320 may be configured to identify a gaze direction of a user of the wearable electronic device 300 through the sensor 380, identify whether a direction corresponding to the external event is identical to the user's gaze direction, and transmit a signal for activating an ambient sound listening function to the external wearable electronic device 400, through the communication circuit 370, based on the direction corresponding to the external event being identical to the user's gaze direction.

According to various embodiments, the processor 320 may be configured to control the display 350 to, based on the direction corresponding to the external event being not identical to the user's gaze direction, display, visual information corresponding to the external event, based on at least one of the first audio data or the second audio data.

According to various embodiments, the processor 320 may be configured to identify the user's second gaze direction through the sensor module while the visual information is displayed on the display 350, identify that the direction corresponding to the external event is identical to the second gaze direction, and based on the direction corresponding to the external event being identical to the second gaze direction, control the display 350 to stop displaying the visual information corresponding to the external event and transmit a signal for activating the ambient sound listening function to the external wearable electronic device 400, through the communication circuit 370.

According to various embodiments, a method performed in a wearable electronic device (e.g., the wearable electronic device 300) may include obtaining audio data, identifying whether the audio data satisfies a predetermined condition, receiving, from an external wearable electronic device (e.g., the external wearable electronic device 400), state information based on a signal obtained from the external wearable electronic device 400, and displaying visual information corresponding to the audio data, based on at least part of the state information.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 340) including one or more instructions that are stored in a storage medium (e.g., internal memory 336 or external memory 338) that is readable by a machine (e.g., the electronic device 301). For example, a processor (e.g., the processor 320) of the machine (e.g., the electronic device 301) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. A wearable electronic device comprising:
a display;
communication circuitry;
a voice input device;
at least one processor; and
memory configured to store instructions which, when executed by the at least one processor, cause the wearable electronic device to:
obtain audio data through the voice input device,
identify whether the audio data satisfies a predetermined condition,
receive, from an external wearable electronic device through the communication circuitry, state information based on a signal obtained from the external wearable electronic device, wherein the state information indicates whether the external wearable electronic device is outputting a voice, and
based on identifying that the external wearable electronic device is outputting the voice:
determine to perform speech to text converting,
convert an input voice in the audio data into text form, and
control the display to display visual information corresponding to the input voice in the text form, based on at least part of the state information.

2. The wearable electronic device of claim 1, wherein the predetermined condition includes at least one of a condition that the audio data includes a language-related voice, a condition that the audio data includes a predetermined word-related voice, or a condition that the audio data includes a voice having a volume greater than or equal to a predetermined volume.

3. The wearable electronic device of claim 1, wherein the state information indicates whether the external wearable electronic device is being worn by a user.

4. The wearable electronic device of claim 3, wherein the state information includes first data obtained from a first biometric sensor of the external wearable electronic device,
wherein the wearable electronic device includes a second biometric sensor, and
wherein the instructions, when executed by the at least one processor, cause the wearable electronic device to:
obtain second data through the second biometric sensor,
identify that the user wearing the external wearable electronic device is wearing the wearable electronic device, based on the first data and the second data, and
control the display to display the visual information corresponding to the audio data, based on identifying that the user wearing the external wearable electronic device is wearing the wearable electronic device.

5. The wearable electronic device of claim 3, wherein the instructions, when executed by the at least one processor, cause the wearable electronic device to:
control the display to display a visual indicator indicating that a speech to text service is available, based on identifying that the external wearable electronic device is being worn by the user, and the external wearable electronic device is outputting the voice, and
control the display to display the visual information corresponding to the audio data, in response to a reaction condition regarding the user being satisfied while the visual indicator is displayed on the display.

6. The wearable electronic device of claim 5, wherein the reaction condition includes at least one of:
a condition a gaze of the user is directed toward the visual indicator for greater than or equal to a predetermined first time,
a condition that a predetermined utterance by the user is detected, or
a condition that a predetermined first gesture by the user is detected.

7. The wearable electronic device of claim 5, wherein the instructions, when executed by the at least one processor, cause the wearable electronic device to control the display to further display the visual information corresponding to the audio data before the reaction condition is satisfied.

8. The wearable electronic device of claim 1, wherein the state information indicates that a priority of a noise canceling function of the external wearable electronic device is higher than a priority of an ambient sound listening function of the external wearable electronic device, and
wherein the instructions, when executed by the at least one processor, cause the wearable electronic device to control the display to display the visual information corresponding to the audio data, based on identifying that the priority of the noise canceling function is higher than the priority of the ambient sound listening function.

9. The wearable electronic device of claim 1, wherein the audio data comprises first audio data, and
wherein the state information includes second audio data obtained from the external wearable electronic device.

10. The wearable electronic device of claim 9, wherein the instructions, when executed by the at least one processor, cause the wearable electronic device to:
obtain third audio data by processing the first audio data based on the second audio data, and
control the display to display visual information corresponding to the third audio data.

11. The wearable electronic device of claim 1, wherein the instructions, when executed by the at least one processor, cause the wearable electronic device to adjust a visual feature of the visual information according to a volume of a voice corresponding to the audio data.

12. The wearable electronic device of claim 1, wherein the instructions, when executed by the at least one processor, cause the wearable electronic device to:
identify whether a condition for stopping providing the visual information is satisfied while controlling the display to display the visual information corresponding to the audio data, and
control the display to stop the displaying of the visual information corresponding to the audio data, based on the condition for stopping providing the visual information being satisfied, and
wherein the condition for stopping providing the visual information includes at least one of:
a condition a gaze of a user is not directed toward the visual information for a time greater than or equal to a predetermined second time,
a condition that a predetermined second gesture by the user is detected, or
a condition that an accuracy of at least one sentence included in the visual information corresponding to the audio data is less than or equal to a predetermined level.

13. A wearable electronic device comprising:
a display;
a communication circuit;
a voice input device;
a sensor;
at least one processor; and a memory configured to store instructions which, when executed by the at least one processor, cause the wearable electronic device to:
obtain first audio data corresponding to an external event through the voice input device,
receive, from an external wearable electronic device through the communication circuit, second audio data corresponding to the external event and obtained from the external wearable electronic device,
identify a direction corresponding to the external event based on the first audio data and the second audio data,
identify a gaze direction of a user of the wearable electronic device using the sensor,
identify whether the direction corresponding to the external event corresponds to the gaze direction, and
based on the direction corresponding to the external event corresponding to the gaze direction, control the communication circuit to transmit a signal for activating an ambient sound listening function to the external wearable electronic device.

14. The wearable electronic device of claim 13, wherein the at least one processor is further configured to receive the second audio data, based on the first audio data satisfying a predetermined first condition, and
wherein the predetermined first condition includes at least one of a condition that the first audio data includes a language-related voice, a condition that the first audio data includes a predetermined word-related voice, or a condition that the first audio data includes a voice having a volume greater than or equal to a predetermined volume.

15. The wearable electronic device of claim 13, wherein the at least one processor is further configured to:
receive state information from the external wearable electronic device through the communication circuit, and
receive the second audio data, based on the state information indicating that the external wearable electronic device is being worn and is outputting a voice.

16. The wearable electronic device of claim 13, wherein, based on the direction corresponding to the external event being not identical to the gaze direction, the at least one processor is further configured to control the display to display, based on at least one of the first audio data or the second audio data, visual information corresponding to the external event.

17. The wearable electronic device of claim 16, wherein the gaze direction comprises a first gaze direction, and
wherein the instructions further cause the wearable electronic device to:
identify the a second gaze direction using the sensor while the visual information is displayed on the display,
identify that the direction corresponding to the external event is identical to the second gaze direction, and
based on the direction corresponding to the external event being identical to the second gaze direction, control the display to stop the displaying of the visual information corresponding to the external event, and control the communication circuit to transmit a signal for activating the ambient sound listening function to the external wearable electronic device.

18. A method performed in a wearable electronic device, the method comprising:
- obtaining audio data;
- identifying whether the audio data satisfies a predetermined condition;
- receiving, from an external wearable electronic device, state information based on a signal obtained from the external wearable electronic device, wherein the state information indicates whether the external wearable electronic device is outputting a voice; and
- based on identifying that the external wearable electronic device is outputting the voice:
  - determining to perform speech to text converting,
  - converting an input voice in the audio data into text form, and
  - displaying visual information corresponding to the input voice in the text form, based on at least part of the state information.

* * * * *